(12) United States Patent
Hakimuddin

(10) Patent No.: US 10,991,078 B2
(45) Date of Patent: Apr. 27, 2021

(54) INFERRING PETROPHYSICAL PROPERTIES OF HYDROCARBON RESERVOIRS USING A NEURAL NETWORK

(71) Applicant: Saudi Arabian Oil Company, Dhahran (SA)

(72) Inventor: Mustafa Hakimuddin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/131,341

(22) Filed: Sep. 14, 2018

(65) Prior Publication Data
US 2019/0087939 A1 Mar. 21, 2019

Related U.S. Application Data

(60) Provisional application No. 62/559,024, filed on Sep. 15, 2017.

(51) Int. Cl.
*G06T 5/00* (2006.01)
*G06N 3/02* (2006.01)
(Continued)

(52) U.S. Cl.
CPC .............. *G06T 5/001* (2013.01); *G06K 9/40* (2013.01); *G06K 9/46* (2013.01); *G06K 9/6267* (2013.01);
(Continued)

(58) Field of Classification Search
USPC ...................................................... 382/275
See application file for complete search history.

(56) References Cited

U.S. PATENT DOCUMENTS 2,978,673 A 4/1961 Richard
3,014,551 A 12/1961 Chapanis
(Continued)

FOREIGN PATENT DOCUMENTS

WO WO 2008048697 4/2008
WO WO2012118866 9/2012
(Continued)

OTHER PUBLICATIONS

Sheppard et al. (Technique for Image Enhancement and Segmentation of Tomographic Image of Porous Materials, Aug. 2004) (Year: 2004).*

(Continued)

*Primary Examiner* — Wednel Cadeau
(74) *Attorney, Agent, or Firm* — Fish & Richardson P.C.

(57) ABSTRACT

Received image data is enhanced to create enhanced image data using image processing to remove artifacts and to retrieve information associated with a desired target output. Image segmentation is performed on useable enhanced image data to created segmented image data by partitioning the enhanced image data into coherent regions with respect to a particular image-based criterion. Useable segmented image data and auxiliary data is pre-processing for input into a neural network as pre-processed data. The pre-processed data is divided into training, validation, and testing data subsets. A neural network architecture is determined to process the pre-processed data and the determined neural network architecture is executed using the pre-processed data. Output of the determined neural network is post-processed as post-processed data. The post-processed data is compared to a known value range associated with the post-processed data to determine if the post-processed data satisfies a desired output result.

21 Claims, 12 Drawing Sheets
(7 of 12 Drawing Sheet(s) Filed in Color)

(51) Int. Cl.
| | |
|---|---|
| *G06K 9/40* | (2006.01) |
| *G06K 9/46* | (2006.01) |
| *G06K 9/62* | (2006.01) |
| *G06T 7/11* | (2017.01) |
| *G06N 3/08* | (2006.01) |
| *G06N 5/04* | (2006.01) |

(52) U.S. Cl.
CPC ............... *G06N 3/02* (2013.01); *G06N 3/084* (2013.01); *G06N 3/088* (2013.01); *G06N 5/046* (2013.01); *G06T 5/003* (2013.01); *G06T 7/11* (2017.01); *G06T 2207/10024* (2013.01); *G06T 2207/10061* (2013.01); *G06T 2207/10081* (2013.01); *G06T 2207/10088* (2013.01); *G06T 2207/20081* (2013.01); *G06T 2207/20084* (2013.01)

(56) References Cited

U.S. PATENT DOCUMENTS

| | | |
|---|---|---|
| 3,196,385 A | 7/1965 | Smith |
| 3,281,774 A | 10/1966 | Warren |
| 3,719,924 A | 3/1973 | Muir et al. |
| 4,208,732 A | 6/1980 | Ruehle |
| 4,542,648 A | 9/1985 | Vinegar et al. |
| 4,969,129 A | 11/1990 | Currie et al. |
| 5,181,171 A | 1/1993 | McCormack et al. |
| 5,191,557 A | 3/1993 | Rector et al. |
| 5,475,589 A | 12/1995 | Armitage et al. |
| 6,088,656 A | 7/2000 | Ramakrishnan et al. |
| 6,574,565 B1 | 6/2003 | Bush |
| 6,775,619 B2 | 8/2004 | Nyland |
| 7,363,158 B2 | 4/2008 | Stelting et al. |
| 7,925,481 B2 | 4/2011 | Van Wagoner et al. |
| 7,970,545 B2 | 6/2011 | Sanstrom |
| 8,081,796 B2 | 12/2011 | Derzhi et al. |
| 8,170,799 B2 | 5/2012 | Dvorkin et al. |
| 8,184,502 B2 | 5/2012 | Xu et al. |
| 8,234,923 B2 | 8/2012 | Ramamurthy et al. |
| 8,380,642 B2 | 2/2013 | Stundner et al. |
| 8,385,604 B2 | 2/2013 | Orpen |
| 8,473,213 B2 | 6/2013 | Zhu et al. |
| 8,583,410 B2 | 11/2013 | Sisk et al. |
| 8,605,951 B2 | 12/2013 | Baggs et al. |
| 8,938,045 B2 | 1/2015 | Dvorkin et al. |
| 9,046,509 B2 | 6/2015 | Dvorkin et al. |
| 9,047,513 B2 | 6/2015 | Derzhi et al. |
| 9,201,026 B2 | 12/2015 | Walls et al. |
| 9,262,713 B2 | 2/2016 | Shelley et al. |
| 2002/0042677 A1 | 4/2002 | West |
| 2003/0044061 A1* | 3/2003 | Prempraneerach ....... G06T 7/90 382/164 |
| 2007/0061079 A1 | 3/2007 | Hu |
| 2007/0239359 A1 | 10/2007 | Stelting et al. |
| 2009/0259446 A1 | 10/2009 | Zhang et al. |
| 2010/0057409 A1 | 3/2010 | Jones et al. |
| 2010/0198638 A1 | 8/2010 | Deffenbaugh et al. |
| 2010/0305927 A1 | 12/2010 | Suarez-Rivera et al. |
| 2011/0103184 A1 | 5/2011 | Westeng et al. |
| 2011/0191080 A1 | 8/2011 | Klie |
| 2011/0218950 A1* | 9/2011 | Mirowski .......... G06K 9/00536 706/12 |
| 2012/0150510 A1 | 6/2012 | Safonov et al. |
| 2012/0221306 A1 | 8/2012 | Hurley et al. |
| 2012/0275658 A1 | 11/2012 | Hurley et al. |
| 2012/0277996 A1 | 11/2012 | Hurley et al. |
| 2012/0281883 A1 | 11/2012 | Hurley et al. |
| 2013/0013209 A1 | 1/2013 | Zhu et al. |
| 2013/0028051 A1 | 1/2013 | Barkved et al. |
| 2013/0080133 A1 | 3/2013 | Sung et al. |
| 2013/0297272 A1 | 11/2013 | Sung et al. |
| 2013/0297273 A1 | 11/2013 | Altundas et al. |
| 2014/0114627 A1 | 4/2014 | Jones et al. |
| 2015/0129147 A1 | 5/2015 | Sumnicht et al. |
| 2015/0241591 A1 | 8/2015 | Burmester et al. |
| 2016/0109593 A1 | 4/2016 | Saxena et al. |
| 2016/0146973 A1 | 5/2016 | Johnson et al. |
| 2016/0161635 A1 | 6/2016 | Ramsay et al. |
| 2016/0307312 A1 | 10/2016 | Sungkorn et al. |
| 2016/0341707 A1 | 11/2016 | Inan |
| 2019/0271793 A1 | 9/2019 | Wilson et al. |
| 2019/0353813 A1 | 11/2019 | Cobos et al. |
| 2020/0040717 A1 | 2/2020 | Feng et al. |
| 2020/0063532 A1 | 2/2020 | Crouse et al. |

FOREIGN PATENT DOCUMENTS

| | | |
|---|---|---|
| WO | WOwo2012118868 | 9/2012 |
| WO | 2013149126 | 10/2013 |
| WO | 2015/127349 A1 | 8/2015 |
| WO | WO2016012826 | 1/2016 |
| WO | 2017/011658 | 1/2017 |

OTHER PUBLICATIONS

Sheppard et al., Technique for Image Enhancement and Segmentation of Tomographic Image of Porous Materials, Aug. 2004, Elsevier B.V. (Year: 2004).*

Anonymous: "Hoshen-Kopelman algorithm-Wi kipedia", is Jun. 2018 (Jun. 18, 2018), XP055616204, Retrieved from the Internet: URL: https://en.wikipedia.org/w/index.php?title=Hoshen-Kopelman_algorithm&oldid=846451608 [retrieved on Aug. 28, 2019] 5 pages.

International Search Report and Written Opinion issued in International Application No. PCT/US2019/038904 dated Sep. 6, 2019, 16 pages.

International Search Report and Written Opinion issued in International Application No. PCT/US2019/024763 dated Jun. 26, 2019, 16 pages.

Giboli et al., "Reverse time migration surface offset gathers part 1: a new method to produce classical common image gathers," SEG Technical Program Expanded Abstracts 2012, Sep. 1, 2012, 6 pages.

Canadian Office Action issued in Canadian Application No. 3019124 dated Jul. 12, 2019, 5 pages.

PCT International Search Report and Written Opinion of the International Searching Authority issued in International Application No. PCT/US2015/022492 dated Aug. 4, 2015; 11 pages.

Office Action issued in GCC Application No. 2015/29123 dated Jan. 10, 2018; 5 pages.

Anselmetti et al., "Quantitative characterization of carbonate pore systems by digital image analysis," AAPG Bulletin, vol. 82, No. 10, Oct. 1998, 22 pages.

DMT; "DMT CoreScan 3 High-Tech Core Logging Tool"; http://www.corescan.de/fileadmin/downloads/DMT_CoreScan3_Info.pdf; Jan. 31, 2013; pp. 1-20.

Gaillot et al.; "Contribution of Borehole Digital Imagery in Core-Logic-Seismic Integration"; Scientific Drilling, No. 5; Sep. 2007; pp. 50-53.

Hoshen and Kopelman, "Percolation and cluster distribution, I. cluster multiple labeling technique and critical concentration algorithm," Physical Review Board, vol. 14, No. 8, Oct. 15, 1976, 8 pages.

Paulsen et al.; "A Simple Method for Orienting Drill Core by Correlating Features in Whole-Core Scans and Oriented Borehole-Wall Imagery"; Journal of Structural Geology; Published in 2002; pp. 1233-1238.

Selezney et al., "Formation properties derived from a multi-frequency dielectric measurement," SPWLA 47th Annual Logging Symposium, Jun. 4-7, 2006, 12 pages.

Teagle et al.; "Methods" Proceedings of the Integrated Ocean Drilling Program, vol. 309/312; Published in 2006; pp. 1-70.

Vanorio et al., "How mecrite content affects and the transport, seismic and reactive properties of carbonate rocks: Implications for 4D seismic," SEG International Exposition and Annual Meeting, Houston, Oct. 25-30, 2009, 5 pages.

Weger et al., "Quantification of pore structure and its effect on sonic velocity and permeability in carbonates," AAPG Bulletin, vol. 93, No. 10, Oct. 2009, 21 pages.

(56) References Cited

OTHER PUBLICATIONS

WellCAD Software, "4.4 Book 1—Basics," V2011.10.17, ALT, Oct. 17, 2011, 11 pages.

Wilkens et al.; "Data Report: Digital Core Images as Data: An Example from IODP Expedition 303"; Proceedings of the Integrated Ocean Drilling Program, vol. 303/306; Published in 2009; pp. 1-16.

Al Ibrahim and Mustafa, "Multi-scale sequence stratigraphy, cyclostratigraphy, and depositional environment of carbonate mudrocks in the Tuwaiq Mountain and Hanifa formations, Saudi Arabia," Diss. Colorado School of Mines, Arthur Lakes Library, 2014, 208 pages.

Assous et al., "Microresistivity borehole image inpainting," Geophysics vol. 79 No. 2, Mar.-Apr. 2014, 9 pages.

Hurley et al., "Method to Generate Fullbore Images Using Borehole Images and Multi-point Statistics," SPE 120671, SPE Middle East Oil and Gas Show and Conference, Society of Petroleum Engineers, Mar. 15-18, 2009, 18 pages.

Communication Pursuant to Rules 161(1) and 162 EPC in European Application No. 17718181.5 dated Nov. 8, 2018, 3 pages.

Sheppard et al., "Techniques for image enhancement and segmentation of tomographic images of porous materials," Physica A: Statistical Mechanics and its Applications, vol. 339, No. 1-2, Aug. 1, 2004, 7 pages.

Zeljkovic et al., "An algorithm for petro-graphic colour image segmentation used for oil exploration," High Performance Computing and Simulation (HPCS), 2011 International Conference on IEEE, Jul. 4, 2011, 6 pages.

Zhou et al., "Segmentation of petrographic images by integrating edge detection and region growing," Computers and Geosciences, Pergamon Press, vol. 30, No. 8, Oct. 1, 2004, 15 pages.

International Search Report and Written Opinion issued in International Application No. PCT/US2018/051066 dated Nov. 26, 2018, 16 pages.

Thomas et al.; "Rock Physics and Formation Evaluation: Automated Lithology Extraction from Core Photographs" First Break, vol. 29; Jun. 1, 2011; pp. 103-109.

Chai et al., "Automatic discrimination of sedimentary facies and lithologies in reef-bank reservoirs using borehole image logs," Applied Geophysics, 2009, vol. 6, No. 1; pp. 17-29.

Yin et al., "FMI image based rock structure classification using classifier combination," Neural Computing and Applications, 2011, vol. 20, No. 7; pp. 955-963.

Barton et al., "Interactive image analysis of borehole televiewer data. Automated pattern analysis in petroleum exploration," Springer New York, 1992; pp. 223-248.

International Search Report and Written Opinion of the International Searching Authority issued in International Application No. PCT/US2017/024776 dated Jun. 19, 2017; 11 pages.

GCC Examination Report in GCC Appln. No. GC 2019-37366, dated May 18, 2020, 4 pages.

EPO Communication Pursuant to Article 94 (3) EPC in European Application No. 17718181.5, dated Oct. 8, 2020, 5 pages.

GCC Examination Report in GCC Appln. No. GC 2018-35997, dated Jan. 4, 2021, 3 pages.

\* cited by examiner

Table 3 (input data to NN, post image segmentation)

| crop1_R_d1 | crop1_G_d1 | crop1_B_d1 | crop2_R_d1 | crop2_G_d1 | crop2_B_d1 |
|---|---|---|---|---|---|
| 1.8238793 | 0.5683401 | -1.5086590 | 2.0697638 | 0.6204531 | -1.4891759 |
| 2.6231619 | 0.4470621 | -1.4247493 | 1.9500504 | 0.6854213 | -1.4200605 |
| 1.4113835 | 0.6137367 | -1.4420699 | 1.7457714 | 0.7174606 | -1.4768884 |
| -0.4592891 | 0.6569601 | -0.5065297 | -0.3220987 | 0.7984511 | -0.4991420 |
| 1.8390767 | 0.5244251 | -1.3627590 | 1.8708459 | 0.5759359 | -1.3224164 |
| 0.1255957 | 0.7179419 | -0.4196797 | -0.0995855 | 0.6649789 | -0.3550537 |
| 0.0955085 | 0.8272425 | -0.9208240 | 0.3099922 | 0.8157098 | -1.0585228 |
| 1.1564275 | 0.6021879 | -1.2556431 | 1.3470128 | 0.5426641 | -1.2502049 |
| 1.8238793 | 0.5683401 | -1.5086590 | 2.0697638 | 0.6204531 | -1.4891759 |
| 2.6231619 | 0.4470621 | -1.4247493 | 1.9500504 | 0.6854213 | -1.4200605 |
| 1.4113835 | 0.6137367 | -1.4420699 | 1.7457714 | 0.7174606 | -1.4768884 |
| -0.4592891 | 0.6569601 | -0.5065297 | -0.3220987 | 0.7984511 | -0.4991420 |
| 1.8390767 | 0.5244251 | -1.3627590 | 1.8708459 | 0.5759359 | -1.3224164 |
| 0.1255957 | 0.7179419 | -0.4196797 | -0.0995855 | 0.6649789 | -0.3550537 |
| 0.0955085 | 0.8272425 | -0.9208240 | 0.3099922 | 0.8157098 | -1.0585228 |
| 1.1564275 | 0.6021879 | -1.2556431 | 1.3470128 | 0.5426641 | -1.2502049 |
| -0.6284028 | 0.7523535 | 0.0941639 | -0.7135262 | 0.8221566 | -0.2942147 |
| -0.9106505 | 0.8570268 | -0.5608524 | -0.8118468 | 0.8740796 | -0.4720580 |
| -0.9596986 | -0.3778565 | 1.2607979 | -0.8329574 | -0.8111262 | 1.1490084 |
| -0.9550541 | -3.9718901 | 1.6468367 | -0.8278350 | -2.6544728 | 1.3960819 |
| -0.6782514 | -1.7747109 | 1.0110547 | -0.8439534 | -2.0244462 | 1.2352928 |
| 0.4209876 | 0.8383859 | -0.7949855 | 0.1264651 | 0.8543898 | -0.3474919 |
| 1.0610174 | 0.8394221 | -1.3354002 | 0.7053157 | 0.8732470 | -1.4583559 |
| 2.5063311 | -0.2220427 | -1.1252464 | 3.0193647 | 0.0435919 | -1.3777394 |
| -0.5522734 | -1.0544987 | 0.6051689 | 0.0774764 | -1.3011491 | 0.2241687 |
| 0.3825231 | -0.3501722 | -0.2502887 | 0.2893990 | -0.2534472 | -0.2467319 |

FIG. 3A

Table 3 continued (input data to NN, post image segmentation)

| crop1_R_d1 | crop1_G_d1 | crop1_B_d1 | crop2_R_d1 | crop2_G_d1 | crop2_B_d1 |
|---|---|---|---|---|---|
| -0.0022150 | -0.4276046 | 0.2363455 | -0.2814693 | 0.1985589 | 0.2678008 |
| -0.9332034 | -0.4360934 | 1.0798507 | -0.7631176 | -0.0038151 | 0.9815484 |
| -0.6284028 | 0.7523535 | 0.0941639 | -0.7135262 | 0.8221566 | -0.2942147 |
| -0.9106505 | 0.8570268 | -0.5608524 | -0.8118468 | 0.8740796 | -0.4720580 |
| -0.9596986 | -0.3778565 | 1.2607979 | -0.8329574 | -0.8111262 | 1.1490084 |
| -0.9550541 | -3.9718901 | 1.6468367 | -0.8278350 | -2.6544728 | 1.3960819 |
| -0.6782514 | -1.7747109 | 1.0110547 | -0.8439534 | -2.0244462 | 1.2352928 |
| 0.4209876 | 0.8383859 | -0.7949855 | 0.1264651 | 0.8543898 | -0.3474919 |
| 1.0610174 | 0.8394221 | -1.3354002 | 0.7053157 | 0.8732470 | -1.4583559 |
| 2.5063311 | -0.2220427 | -1.1252464 | 3.0193647 | 0.0435919 | -1.3777394 |
| -0.5522734 | -1.0544987 | 0.6051689 | 0.0774764 | -1.3011491 | 0.2241687 |
| 0.3825231 | -0.3501722 | -0.2502887 | 0.2893990 | -0.2534472 | -0.2467319 |
| -0.0022150 | -0.4276046 | 0.2363455 | -0.2814693 | 0.1985589 | 0.2678008 |
| -0.9332034 | -0.4360934 | 1.0798507 | -0.7631176 | -0.0038151 | 0.9815484 |
| -0.6175675 | -0.2066725 | 1.0708500 | -0.8287729 | -0.4363491 | 1.2213691 |
| -0.8752149 | -1.7904447 | 1.5123485 | -0.8233353 | -2.4183445 | 1.4668806 |
| -0.9242821 | -1.4912596 | 1.4042889 | -0.7946669 | -2.0391957 | 1.2571535 |
| -0.5966765 | -0.2591531 | 0.6884667 | -0.6000993 | -0.4190752 | 0.8240808 |
| -0.8719014 | -0.7096039 | 1.0953028 | -0.7651806 | -1.3869495 | 1.0100606 |
| -0.7232371 | 0.4935844 | 0.7465487 | -0.6740511 | 0.4435326 | 0.7407296 |
| -0.6418272 | 0.6346894 | 0.6328901 | -0.6125573 | 0.5730725 | 0.6088117 |
| -0.7079570 | -0.3154111 | 0.8603194 | -0.7876922 | -0.2553501 | 1.1704300 |
| -0.6710347 | -0.0015792 | 0.6913475 | -0.6967050 | 0.4670455 | 0.7404941 |
| -0.7212573 | 0.5041148 | 0.8001229 | -0.6752112 | 0.3208015 | 0.7170946 |
| -0.6624470 | -0.5209981 | 0.9493609 | -0.7069987 | -0.5871310 | 1.0092778 |
| -0.5094837 | 0.1176763 | 0.3059247 | -0.5546688 | -0.2410467 | 0.5945636 |

Table 3 continued (Input data to NN, post image segmentation)

| crop1_R_d1 | crop1_G_d1 | crop1_B_d1 | crop2_R_d1 | crop2_G_d1 | crop2_B_d1 |
|---|---|---|---|---|---|
| -0.2457060 | 0.8352375 | -0.3723724 | -0.1253464 | 0.7951476 | -0.5109876 |
| 0.3364331 | 0.7936171 | -1.2430807 | 0.4321700 | 0.8257513 | -1.2727338 |
| 0.6266776 | 0.7625289 | -1.2810877 | 0.1628910 | 0.7876630 | -1.1227674 |
| -0.2980569 | 0.7459321 | -0.0497787 | -0.3886861 | 0.7054606 | 0.1195901 |
| 0.7366848 | 0.7775264 | -0.8379831 | 0.4238428 | 0.8263258 | -0.7598919 |
| -0.6175675 | -0.2066725 | 1.0708500 | -0.8287729 | -0.4363491 | 1.2213691 |
| -0.8752149 | -1.7904447 | 1.5123485 | -0.8233353 | -2.4183445 | 1.4668806 |
| -0.9242821 | -1.4912596 | 1.4042889 | -0.7946669 | -2.0391957 | 1.2571535 |
| -0.5966765 | -0.2591531 | 0.6884667 | -0.6000993 | -0.4190752 | 0.8240808 |
| -0.8719014 | -0.7096039 | 1.0953028 | -0.7651806 | -1.3869495 | 1.0100606 |
| -0.7232371 | 0.4935844 | 0.7465487 | -0.6740511 | 0.4435326 | 0.7407296 |
| -0.6418272 | 0.6346894 | 0.6328901 | -0.6125573 | 0.5730725 | 0.6088117 |
| -0.7079570 | -0.3154111 | 0.8603194 | -0.7876922 | -0.2553501 | 1.1704300 |
| -0.6710347 | -0.0015792 | 0.6913475 | -0.6967050 | 0.4670455 | 0.7404941 |
| -0.7212573 | 0.5041148 | 0.8001229 | -0.6752112 | 0.3208015 | 0.7170946 |
| -0.6624470 | -0.5209981 | 0.9493609 | -0.7069987 | -0.5871310 | 1.0092778 |
| -0.5094837 | 0.1176763 | 0.3059247 | -0.5546688 | -0.2410467 | 0.5945636 |
| -0.2457060 | 0.8352375 | -0.3723724 | -0.1253464 | 0.7951476 | -0.5109876 |
| 0.3364331 | 0.7936171 | -1.2430807 | 0.4321700 | 0.8257513 | -1.2727338 |
| 0.6266776 | 0.7625289 | -1.2810877 | 0.1628910 | 0.7876630 | -1.1227674 |
| -0.2980569 | 0.7459321 | -0.0497787 | -0.3886861 | 0.7054606 | 0.1195901 |
| 0.7366848 | 0.7775264 | -0.8379831 | 0.4238428 | 0.8263258 | -0.7598919 |

Table 4

| NMR Porosity % |
|---|
| 10.9427 |
| 11.9927 |
| 12.6281 |
| 12.6658 |
| 11.0849 |
| 13.9967 |
| 14.2246 |
| 11.9906 |
| 10.9427 |
| 11.9927 |
| 12.6281 |
| 12.6658 |
| 11.0849 |
| 13.9967 |
| 14.2246 |
| 11.9906 |
| 12.4434 |
| 15.3183 |
| 15.3087 |
| 16.9477 |
| 16.879 |
| 11.5478 |
| 9.3032 |
| 5.2517 |
| 18.29 |
| 14.0823 |

FIG. 4A

Table 4 continued

| NMR Porosity % |
|---|
| 18.2343 |
| 19.8533 |
| 12.4434 |
| 15.3183 |
| 15.3087 |
| 16.9477 |
| 16.879 |
| 11.5478 |
| 9.3032 |
| 5.2517 |
| 18.29 |
| 14.0823 |
| 18.2343 |
| 19.8533 |
| 15.1106 |
| 15.4014 |
| 16.5262 |
| 16.6213 |
| 17.7206 |
| 12.3679 |
| 11.0698 |
| 11.0645 |
| 11.9452 |
| 15.0907 |
| 12.4391 |
| 11.6514 |

FIG. 4B

Table 4 continued

| NMR Porosity % |
|---|
| 13.6831 |
| 13.7181 |
| 12.5593 |
| 13.38 |
| 11.8791 |
| 15.1106 |
| 15.4014 |
| 16.5262 |
| 16.6213 |
| 17.7206 |
| 12.3679 |
| 11.0698 |
| 11.0645 |
| 11.9452 |
| 15.0907 |
| 12.4391 |
| 11.6514 |
| 13.6831 |
| 13.7181 |
| 12.5593 |
| 13.38 |
| 11.8791 |

FIG. 4C

INFERRING PETROPHYSICAL PROPERTIES OF HYDROCARBON RESERVOIRS USING A NEURAL NETWORK

CROSS-REFERENCE TO RELATED APPLICATIONS

This application claims the benefit of priority to U.S. Provisional Application Ser. No. 62/559,024, filed on Sep. 15, 2017, the contents of which are hereby incorporated by reference.

BACKGROUND

In the recovery of hydrocarbons, fundamental petrophysical properties of hydrocarbon reservoirs include permeability, porosity, saturation, and residual hydrocarbon saturation. These petrophysical properties can be inferred from physical well cores and change non-linearly as a function of, for example, direction, location, stress conditions, and fluid type. Knowing the stratigraphic and well-to-well distribution of permeability is key to predicting hydrocarbon reservoir performance. Petrophysical properties collected from various wells can be extended to an entire production field and used to infer properties of and to predict performance of a specific hydrocarbon reservoir. The major difficulty in predicting permeability in a mature hydrocarbon reservoir is a lack of sufficient data, particularly when using well core analysis. After obtaining a well core, the quality of information that can be extracted from the well core for analysis is reduced as a function of time (for example, due to storage, transportation, environmental conditions, and handling). Without accurate permeability data, petrophysical property predictions can be inaccurate and lead to unnecessarily-high hydrocarbon recovery costs.

SUMMARY

The present disclosure describes methods and systems, including computer-implemented methods, computer program products, and computer systems for inferring petrophysical properties of a hydrocarbon reservoir using a neural network (NN).

In an implementation, received image data is enhanced to create enhanced image data using image processing to remove artifacts and to retrieve information associated with a desired target output. Image segmentation is performed on useable enhanced image data to created segmented image data by partitioning the enhanced image data into coherent regions with respect to a particular image-based criterion. Useable segmented image data and auxiliary data is pre-processing for input into a neural network as pre-processed data. The pre-processed data is divided into training, validation, and testing data subsets. A neural network architecture is determined to process the pre-processed data and the determined neural network architecture is executed using the pre-processed data. Output of the determined neural network is post-processed as post-processed data. The post-processed data is compared to a known value range associated with the post-processed data to determine if the post-processed data satisfies a desired output result.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, porosity for an entire well core can be inferred before plugs (or samples) have been physically removed from the well core (for example, usually saving 6-12 months). Second, fluid saturation for an entire well core can be inferred (for example, usually saving 6-9 months necessary for analysis after a computed tomography (CT)-scan). Third, permeability of a cored zone can be inferred 6-12 months earlier than a typical process. Fourth, overall, typically a year can be saved in a core log integration process and a core processing cost savings of over 45% can be realized (for example, due to a reduced or eliminated need to gather targeted samples from a well core and the associated cost of determining profile parameters using the targeted samples). Fifth, typical samples can take an average of six months to recover from a well core. Test data quality is reduced the longer it takes to process a core sample and run tests. Using lower-quality test data results in analytical inaccuracy. Sixth, a described methodology uses the NN to analyze auxiliary data (such as, laboratory, field, or other data that is usually discarded after collection due to an apparent lack of applicability to any theorem, physical/engineering law, calculations, or established equation/relation. The auxiliary data can include, for example, data used in petrophysical analysis or medicine. Any other auxiliary data consistent with this disclosure is considered to be within the scope of this disclosure. For example, data for an unsteady state, relative permeability test can include incremental production due to a: 1) change in rate of fluid injection; 2) change in stress; 3) change in temperature; 4) reaction between fluids; and 5) reaction between rock and fluids. This data can be input to the NN in the described methodology (for example, at a data pre-processing stage for NN input). Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

The patent or application file contains at least one drawing executed in color. Copies of this patent or patent application publication with color drawing(s) will be provided by the Patent and Trademark Office upon request and payment of the necessary fee.

FIGS. 3A-3C illustrate a table representing usable data following image enhancement and image segregation (input data for a selected NN), according to an implementation of the present disclosure.

FIGS. 4A-4C illustrate a table representing known values (target data for the selected NN) of porosity for each processed image, according to an implementation of the present disclosure.

Like reference numbers and designations in the various drawings indicate like elements.

DETAILED DESCRIPTION

Figure 1A:
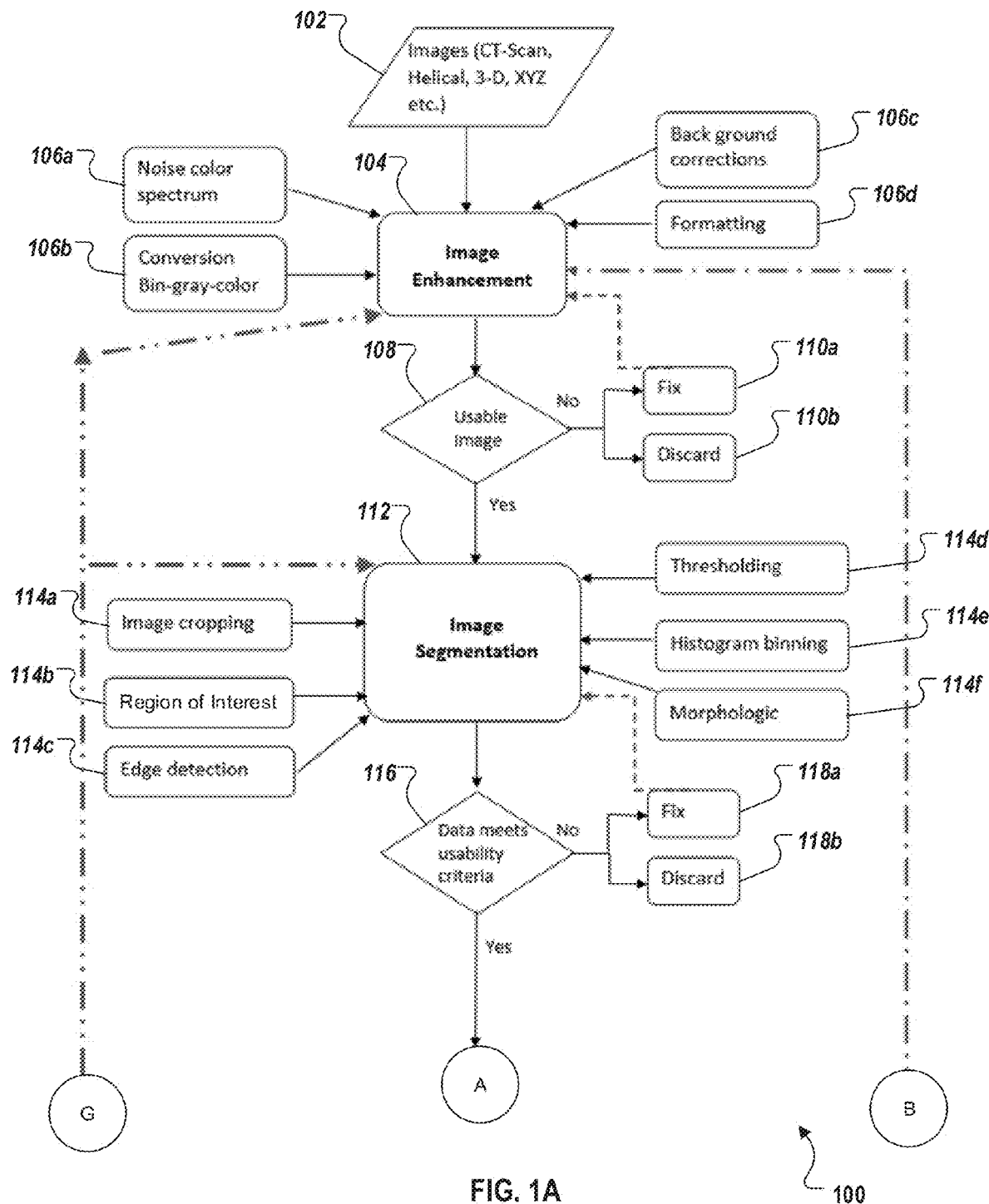
FIGS. 1A-1D illustrate a flow chart of an example method or inferring petrophysical properties of a hydrocarbon reservoir using a neural network (NN), according to an implementation of the present disclosure.

The following detailed description describes inference of petrophysical properties of a hydrocarbon reservoir using a neural network (NN), and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from scope of the disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The most important value of an extracted physical well core to a hydrocarbon recovery operator is in providing an estimation of petrophysical characteristics of a hydrocarbon reservoir. The estimated petrophysical characteristics can be used for estimating an amount of hydrocarbons present, how easy it is for the hydrocarbon to flow, how much of the hydrocarbons can be extracted conventionally, how much of the hydrocarbons will remain behind after using conventional means of extraction, and at what locations the leftover hydrocarbon will reside.

Fundamental petrophysical properties of hydrocarbon reservoirs include permeability, porosity, saturation, wettability, and residual hydrocarbon saturation. These petrophysical properties can be inferred from physical well cores and change non-linearly as a function of, for example, direction, location, stress conditions, and fluid type. Knowing the stratigraphic and well-to-well distribution of permeability is key to predicting hydrocarbon reservoir performance. Petrophysical properties collected from various wells can be extended to an entire production field and used to infer properties of and to predict performance of a specific hydrocarbon reservoir.

The major difficulty in predicting permeability, for example, in a mature reservoir is lack of sufficient data, particularly when using well core analysis. After obtaining a well core, the quality of information that can be extracted from the well core is reduced as a function of time (for example, due to storage, transportation, environmental conditions, and handling). Without accurate permeability data, petrophysical property predictions can be inaccurate and lead to unnecessarily-high hydrocarbon recovery costs.

What is needed is the ability to use well core images for:
Permeability estimation (for example, horizontal, vertical, and directional),
Porosity estimation (for example, horizontal, vertical, and directional),
Mud invasion estimation and depth/direction of the estimated mud invasion,
Filtrate invasion estimation and depth/direction of the filtrate invasion,
Core damage estimation,
Fluid saturation estimation,
Providing locations of horizontal plugs for carbon capture and storage (CCS) and special core analysis laboratory (SCAL) tests,
Providing locations of vertical plugs for saturation,
Providing locations of plugs for rock mechanics,
Sponge saturation analysis of fluids (using a sponge core image),
Estimating invasion of various fluids in sponge and core (for example, using a sponge core image),
Estimating depth and direction of fluid invasion in a well core, radially and as function of depth and time (for example, using both an in-field sponge core scan and an in-lab sponge core scan), and
Identifying/differentiating between natural and induced fractures.

Artificial intelligence (AI) techniques and, specifically, the use of NNs, play a central role in complex, non-linear problem solving. Leveraging NNs enable the finding of solutions where algorithmic methods are computationally intensive or do not exist. NNs help to overcome limitations of physical models that are dependent on initial and boundary conditions for generation of one or more solutions. Conventional equations for linear/nonlinear systems depend on iterations to arrive at a desired outcome, where the conventional equations are derived from or attempt to mimic a law, theorem, or universal observation. Another limitation is due to a need to define initial and boundary conditions, where assumptions are made to perform the calculations. NNs are based on modeling brain neurons that work together as a memory cell and not a specific criterion. A NN looks at data as a whole and tries to identify trends and learn from found trends to predict values.

Described is the utilization of AI/NN techniques using an AI/NN calculation engine (for example, MATLAB by Mathworks, Inc., of Natick, Mass., USA, or a custom AI/NN engine implemented as hardware, software, or a combination of both) and data from various well core and fluid images (for example, X-ray, computed tomography (CT)-scan (slice or helical), X-ray Powder Diffraction (XRD), Scanning Electron Microscopy (SEM), gamma scan, ultrasound, and Magnetic Resonance Imaging (MRI)) to infer petrophysical properties of hydrocarbon reservoirs. These example imaging techniques use electromagnetic radiation from gamma rays, through the visible spectrum, and to radio waves, with frequency wavelengths measuring $10^{-12}$-$10^{3}$ meters (m), respectively).

The use of the described AI/NN techniques can provide one or more of, but are not limited to, the following:
Permeability inference (for example, horizontal, vertical, and directional) for the entire depth of a well core, Porosity inference (for example, horizontal, vertical, and directional) for the entire depth of a well core, Simple correlation of log data, Location of damage zones based on log correlation from provided data, Location of fracture zones based on log correlation from provided data, Location of zones most suitable for fracturing based on log correlation from provided data, Estimation of reservoir integrity as a function of depth, Increased understanding of fluid mobility as a function of directional permeability, Increased understanding of fluid mobility as function of fluid type, Increased understanding of fluid mobility as a function of depth, Increased understanding of isolation/barrier zones, Increased understanding of communication across various reservoirs, barriers, and zones, Evaluation of historic/legacy whole core CT-scan data, Help in analyzing enhanced oil recovery (EOR) effects and locations of thief zones, Help in identifying target locations/depths for EOR injection, Help understanding and evaluating EOR effectiveness, identifying issues, and mitigation of issues, Pore size distribution, and Pore throat size distribution.

Monetary savings of the described AA/NN techniques can include, but are not limited to: 1) a reduction of a number of physical plugs needed for analysis; 2) a reduction in failed plug attempts (for example, savings in labor, fluids, machine time, and electricity); 3) preservation of naturally fractured whole cores for future studies; and 4) sponge core value evaluation.

As previously stated, the quality of information that can be extracted from well core is reduced as a function of time (for example, due to storage, transportation, environmental conditions, and handling). Currently, the standard practice in the hydrocarbon recovery industry is to transport a well core to a laboratory facility and to retrieve many plugs of material from the well core in order to run material balance tests (for example, using the Dean-Stark technique) and to measure air permeability and porosity values. Plug handling and processes, such as cleaning and drying, introduces a plug to various fluids and temperature and pressure cycles that cause irreversible damage to the plug. As a result, results of any tests performed on a plug are compromised and overall analysis results are skewed.

In order to mitigate damage to a well core, a hydrocarbon recovery operator will attempt to stabilize the entire core in the field (for example, inject a foam material into the well core barrel to minimize fluid loss) and to quickly transport the stabilized well core to a laboratory (for example, within 24 hours) so that the well core can be examined in controlled conditions. At the receiving laboratory, the well core is retrieved from the well core barrel and exposed to ambient conditions where one or two plugs are taken from the well core (for example, every 3 feet (ft)).

As illustrated in Table 1, the taken plugs represent about 1-2% of the entire well core section (*10 kilometers squared ($km^2$) reservoir with 50 ft pay):

TABLE 1

| Specimen | Length inch (in) | Diameter in | Length centimeter (cm) | Diameter cm | Area $cm^2$ | Volume $cm^3$ |
|---|---|---|---|---|---|---|
| Specimen Plug | 3 | 1.5 | 7.62 | 3.81 | 11.40 | 86.87 |
| 3 ft section of 4 in diameter core | 36 | 4 | 91.44 | 10.16 | 81.07 | 7413.33 |
| Percentage, $(V_{plug}/V_{Core}) \times 100 =$ | | | 1.17% | | | |
| Percentage, $(V_{plug}/V_{reservoir}^*) \times 100 =$ | | | 0.015% | | | |
| Plug represents 0.015 percent of the reservoir* | | | | | | |
| Plug represents 1.17 percent of the core | | | | | | |

An additional advantage of the described technique is the ability to evaluate integrity of a captured well core. In many cases where a well core has been damaged (for example, quick retrieval from a well causing fluid expansion and fracturing, improper stabilization resulting in damage during transport, improper storage leading to drying and salt crystallization, and improper mud type and circulation rate used during the well bore coring resulting in the well core being over-invaded with mud and mud filtrate and some or all of the reservoir fluids being replaced in the well core). Damaged well core integrity can result in high monetary loss and incorrect estimations. For example, an artificial well core fracture can make core porosity and permeability values much higher than actual values and lead to elevated estimates of hydrocarbon reserves. In the case of excessive mud filtrate invasion, an artificial well core fracture can result in estimates of extremely high oil reserves or very low hydrocarbon reserves, depending on the type of mud used (for example, whether oil-based or water-based).

Table 2, illustrates estimated lost revenue of over $3 million US just from targeting costs involved with well cores captured for analysis without the costs of drilling the well. The table does not include costs of erroneous estimates of reserves due to compromised specimens from well cores used for analysis, costs of time loss between scrapping results and planning, and drilling and retrieving a new well core for analysis. Just adding a lower value for a new well at an average depth adds $10 million US to the example scenario.

TABLE 2

| Processes | US Dollars($) | Foot of core | Total cost US $ | Total cost Saudi Riyal (SAR) |
|---|---|---|---|---|
| Drilling cost per foot | 50 | 1,000 | 50,000 | 187,500 |
| Stabilization cost per foot | 50 | 1,000 | 50,000 | 187,500 |
| Transportation cost per foot | 50 | 1,000 | 50,000 | 187,500 |
| Plugging cost per foot | 50 | 1,000 | 50,000 | 187,500 |
| Dean Stark cost per foot | 75 | 1,000 | 75,000 | 281,250 |
| Routine grain density (GD), permeability and porosity cost per foot | 50 | 1,000 | 50,000 | 187,500 |
| Gamma, CT-Scan and other routine process | 50 | 1,000 | 50,000 | 187,500 |
| Cost of SCAL test In-Kingdom/Out-of-Kingdom (IK/OOK) | 3,000 | 1,000 | 3,000,000 | 11,250,000 |
| Cost of compromise data high porosity | | | | |
| Cost of compromise data high permeability | | | | |
| Cost of high water saturation (low | | | | |

TABLE 2-continued

| Processes | US Dollars($) | Foot of core | Total cost US $ | Total cost Saudi Riyal (SAR) |
|---|---|---|---|---|
| hydrocarbon) water-based mud (WBM) Cost of low water saturation (high hydrocarbon) oil-based mud (OBM) | | | | |
| Cost of new well for getting another core Cost of time delay for new well coring. | | | 10,000,000 | 37,500,000 |
| Grand total cost | | | 13,375,000 | 50,156,250 |

In Table 2, Dean Stark refers to a process of selective leaching of rock samples, where solvent vapors (for example, Toluene or chloroform) are used to remove hydrocarbon and water from a sample. Followed the removal of hydrocarbons and water from the sample, the sample is leached with solvent vapors (for example, Methanol) to remove salt from the sample.

In typical implementations, a color image can be represented by an intensity function, where RGB stands for red, green, blue (or red-green-blue), respectively:

$$I_{RGB} = (FR, FG, FB) \qquad (1),$$

where fR(x, y) represents an intensity of a pixel (x, y) in the red channel, fG(x, y) represents an intensity of a pixel (x, y) in the green channel, and fB(x,y) represents an intensity of a pixel (x, y) in the blue channel.

At a high-level, components of an overall method for inferring petrophysical properties of a hydrocarbon reservoir using a NN can include:
1. Pre-processing and filtering—operations that give as a result a modified image with the same dimensions as the original image (for example, contrast enhancement and noise reduction),
2. Data reduction and feature extraction—operations that extract significant components from an image window. The number of extracted features is generally smaller than the number of pixels in the input window,
3. Segmentation—operations that partition an image into regions that are coherent with respect to some criterion. One example is the segregation of different textures.
4. Object detection and recognition—determining position, and possibly orientation and scale, of specific objects in an image and classifying the objects (for example, determination of directional permeability, anomaly, and fracture orientation),
5. Image understanding—obtaining high-level (semantic) knowledge of what an image represents, and
6. Optimization—minimization of a criterion function which may be, for example, used for graph matching or object delineation. Note that optimization techniques are not seen as a separate step in an image processing chain, but as a set of auxiliary techniques, which support other described steps.

Besides actual tasks performed by a described algorithm, particular algorithm processing capabilities are partly determined by an abstraction level of input data received by a particular algorithm. With respect to this disclosure, many process can be used for distinguishing between abstraction levels. For example:
1. Pixel intensity level—intensities of individual pixels,
2. Local feature level—a set of derived, pixel-based features,
3. Structure (edge) level—a relative location of one or more perceived features (for example, edges, corners, joints, and surfaces),
4. Object level—properties of individual objects,
5. Object set level—mutual order and relative location of detected objects,
6. Image characterization—a complete description of the image, possibly including lighting conditions and context,
7. Color frequency—utilization of the frequency spectrum of electromagnetic radiation,
8. Color intensities—property derivation as a function of intensity of a constituent color, and
9. Color Spatial feature—established relationships among various features (for example, grain typing).

As an example of the application of the previously described high-level method components and determination of input data abstraction level, a CT-scan image of a well core can be taken and image analysis and segmentation performed as follows (refer to at least FIG. 1A for additional detail):
1. Image enhancement:
    a. Removal of well core barrel artifacts,
    b. Image noise removal, and
    c. Image sharpening;
2. Image color base segmentation (for example, RGB separation):
    a. Disseminate in to various color ranges from 0 to 256,
    b. Convert images to gray scale and get attributes, and
    c. Convert images to black and white and perform analysis for classification;
3. Image color base segmentation (hue and saturation):
    a. Segregate based on color hue,
    b. Segregate based on saturation, and
    c. Segregate base on spatial attributes;
4. Image histogram base analysis:
    a. Binning based on color segregation in b. and c. of "Image color base segmentation (hue and saturation)",
    b. Classification based on binning spread and amplitude, and
    c. Targeting of zone of interest based on petrophysical data estimation; and
5. Edge detection:
    a. Based on color value,
    b. Based on saturation value, and
    c. Based on spatial attributes.

Consistent with this previous discussion, the following describes a particular implementation of the use of AA/NN techniques for inferring petrophysical properties of a hydrocarbon reservoir. As will be understood by those of ordinary skill in the art, the various described techniques can be used as part of differently arranged methodologies and in different technical implementations to accomplish the described subject matter. These variations, as far as they are consistent with this disclosure, are also considered to be within the scope of this disclosure.

FIGS. 1A-1D illustrate a flow chart of an example method 100 for inferring petrophysical properties of a hydrocarbon reservoir using a NN, according to an implementation of the present disclosure. For clarity of presentation, the description that follows generally describes method 100 in the context of the other figures in this description. However, it will be understood that method 100 may be performed, for example, by any suitable system, environment, software, and hardware, or a combination of systems, environments, software, and hardware as appropriate. In some implementations, various steps of method 100 can be run in parallel, in combination, in loops, or in any order.

Method 100 is divided into two primary sections: 1) image analysis, segmentation and understanding and 2) NN prediction of petrophysical properties estimations. From section 1), only data meeting usability criteria at 116 is used in section 2 for NN prediction of petrophysical properties estimations.

At 102, image data (for example, X-ray, CT-scan (slice or helical), X-ray Powder Diffraction (XRD), Scanning Electron Microscopy (SEM), Gamma scan, ultrasound, and Magnetic Resonance Imaging (MRI)) from a well core is generated and made available for processing. The image data can represent any type of data from a laboratory or field as long as the data can be represented as an image. From 102, method 100 proceeds to 104.

At 104, a received image is enhanced through image pre-processing to retrieve useful information from the image for a desired target output and to remove artifacts present due to a particular condition of well core (for example, due to overall well core physical condition (for example, cracks or missing pieces), casing (the type of material enclosing the core), orientation of the core, material surrounding of the core, the type of fluid used to drill the well, the mechanism by which the well core was lifted out of the well, the rate at which the well core is pulled out of the well, how the well core was laid on a drilling rig floor, how the well core was stabilized on the drilling rig surface (for example, using injected foam or fluid), pressure and temperature differences with respect to the well core in a well and when it reaches the atmospheric condition at the drilling rig site) when imaged.

In typical implementations, image enhancement can be based on petrophysical properties/parameters associated with a reservoir, well site, condition of an entire well core, or other property/parameter. Image enhancement processes are applied to each received image under investigation to obtain a more suitable image than the original image, based on a specific need. There are many reasons for image enhancement, from simple image sharpening and noise reduction to a more targeted image enhancement based on information available for a specific core. For example, there could be mud invasion or mud filtrate invasion within a well core sample, which may or may not be of interest. Image enhancement can help prepare an image to better allow multiple analyses to be performed to better understand an impact of mud invasion on a desired porosity calculation.

The most common steps in image enhancement includes: 1) intensity and spatial filtering, where an image may need to be converted for a particular frequency domain to address artifacts introduced by instruments (for example, emitter or receiver artifacts) or environmental conditions (for example, ambient noise and underground structures) and 2) image restoration, especially for images of very low quality or saved in non-compatible formats. In some instances, other image enhancement techniques may be needed, such as compression and morphological processing based on the quality of a received image and desired results. There are multiple available method to utilize formatted or unformatted image data to obtain petrophysical properties. Any image enhancement method consistent with this disclosure, whether commercial, open source, or proprietary is considered to be within the scope of this disclosure.

Examples of image enhancement can include, but are not limited to, noise color spectrum analysis 106a for noise removal (for example, salt and pepper noise, Gaussian noise, speckle noise, and Poisson noise) to mitigate artifacts introduced to an image due to issues related to the imaging instrument, image format used (for example, JPG/JPEG, BMP, PNG, DLIS, LIS, LAS, XML, or other analog/digital format), reservoir or well site conditions, transportation (for example, the cradle assembly holding the well core, the covering used on the well core, or the orientation of the well core), handling, and environmental conditions; conversion to grayscale 106b (for example, to address hue or saturation of pixels in a color image); background corrections 106c (for example, to differentiate an object of interest in an image from the rest of the image (such as, related to the material covering the well core or parameters of the imaging instrument); and formatting the image 106d (for example, for a particular resolution and color palate) to deal with limitations introduced when images are saved in various formats. With respect to 106d, different image formats modify and store format-specific information about an image in different ways. As many imaging instruments (for example, a CT-Scan) are capable of storing images in multiple formats, for a given entire well core, multiple formats of images/partial images of the same well core section/entire well core could be used or converted between depending on image format properties.

A particular image can have one or more image enhancement techniques performed against it. Image enhancement techniques can also be performed in different orders. The number of image enhancement techniques performed or the order of image enhancement techniques can vary depending on the image format, size, or any other criterion/criteria consistent with this disclosure.

As a particular example of image enhancement, porosity is considered. In this example, a CT-scan image of a 1000 ft. well core is acquired at a well site. The example core is 4.0 in. in diameter and is encased in a 5.0 in. diameter aluminum casing (barrel). There is a 1.0 in. thick layer of a special uni-directional sponge between the well core and the barrel that provides both support to the well core and also helps in mitigating radial movement of reservoir fluids away from well core itself. The barrel is cut into sections (for example, 3.0 ft. sections) and both ends of each barrel section is sealed at the well site, such that no fluid can escape from the barrels or get into the barrels from the environment.

The well core barrel sections are shipped to an X-ray laboratory. During the transport and storage, the ambient environment is controlled such that the temperature remains between 18° C. to 20° C. at ambient pressure conditions. Also, each barrel can be equipped with a shock and tip sensor to make sure orientation of the barrel is properly maintained in relation to its orientation in the earth.

At the X-Ray laboratory the core sections are imaged typically within 48 hours of retrieval from a reservoir well site. X-ray imaging can include CT-scanning with one X-direction scan, one Y-direction scan, and 10 Z-direction slices every foot of well core length. Color images are generated for each scan, labelled for proper identification, and saved in an image data file format (for example, JPEG). For example:

$$\text{well\_depth\_raw\_jpg }(x,y,z) = \text{instrument\_scan\_result\_x1}yz \qquad (2),$$

where a total of 12,000 (1000−X, 1000−Y, 10,000−Z) CT-scan color images are generated, each image depending on a resolution of millions of pixel with each pixel consisting of 256 bits along with spatial information for each pixel. Since each pixel has spatial information attached to it, the matrix can be treated as a vector. These images can then be provided (102) for image enhancement and other processes. Note that an analog sensor response (for example, of the CT-scan) of the well core segment is converted into digital data.

In some implementations, a database can be generated from each well analyzed to provide image data that can be further used to determine petrophysical properties other than, for example, porosity, permeability, and fluid saturation. The images can be read in to a matrix using an array command and stored sequentially with an identifier for sample identification and image orientation.

Image enhancement can also be used to remove artifacts introduced by the CT-scan beam hardening, thickness of the barrel, and material of the barrel (for example, aluminum, but the barrel could be of other materials, such as steel, plastic, or composites). The removal of these artifacts is aided by utilization of various base scans for material and instrument (CT-scan) base properties. A secondary image enhancement to remove artifacts can also be applied if the presence of artifacts is due to image color frequency and conversion from a particular instrument image data file format to a different (for example, JPEG) format.

The two main enhancement processes related to the spatial domain and frequency domain. For obtaining bulk porosity, a spatial domain enhancement could suffice, but to obtain a more integrated understanding of inter-granular, macro/micro porosities, and, especially, in unconventional cases, both spatial and frequency domain enhancements are required. Unconventional cases relate to well cores removed from unconventional reservoirs including, for example, shale, tight gas sand, unconsolidated sand, and tar sand. In particular, in typical implementations, frequency domain enhancement requires Fourier transformations to be performed.

Spatial domain filtering can be used to improve image quality, where the original image I_org is converted using a function $f$ to I_sp1. For example:

$$I\_sp1 = f(I\_org) \quad (3),$$

where function $f$ could simply be a function working on a specific set of pixels for reducing noise in the image. Other possible spatial domain filtering functions could include, for example, linear, arithmetic, logical, mask, intensity level, color spectrum, log, power-law, histogram-based, derivative, and Laplacian.

Image brightness can also be enhanced (either less or more bright) to deliver an image within a particular required brightness range. Image brightness enhancement can help to distinguish between fracture porosity from matrix porosity and in an analysis of natural and induced fractures.

Images can also be enhanced for sharpness to bring out distinguishing features. For example, a sharper image can assist with a determination of whether a fracture is natural or induced.

An image enhancement of combining several images as a function of depth can be used to remove a particular feature of a well core sample (for example, remove a certain range of porosities) to help in NN analysis of petrophysical properties that depend on a specific porosity type.

Histograms provide a powerful image enhancement tool that can be used to provide a threshold basis of, for example, pixel values, color values, and saturation or spatial values that can be applied to all images as a universal filter. By changing a histogram value range, multiple universal filters can be generated and applied to received images.

As will be appreciated by those of ordinary skill in the art, the described image enhancement techniques are provided for example purposed to aid in understanding of the described techniques. Image enhancement techniques are not limited to only the described techniques, but to any technique consistent with this disclosure. Also, image enhancement techniques are not limited to an initial image processing stage of the described method 100. In typical implementations, image enhancement can be used in the other portions of method 100 as appropriate (for example, during image segmentation to generate data for NN use and in manipulation of NN output to predict petrophysical properties of interest). The result of image enhancement typically includes two or more images, including the format of the original image from 102 (for example, JPEG) and other formats (for example, BMP and PNG) depending on the data desired and the best image format(s) available for visualizing the data. From 104, method 100 proceeds to 108.

At 108, a determination is made whether one or more enhanced images are usable for the described methodology. Reasons to determine usability of an enhanced image can include, for example, that an imaged well core sample is not from the well core itself but is some other material (for example, mud or fluid), the image generated from a scan of a well core is distorted due to artifacts introduced by an imaging instrument (implying that a re-image of the well core is needed), the image enhancement techniques are not capable of a necessary enhancement and different or new techniques need to be developed.

In typical implementations, usability of each image from 104 is evaluated with respect to a usability criterion or set of usability criteria. Usability criteria can include, for example, pixel density criteria—such as, pixel density of a given set of spectrum frequencies, ratio of pixel density of one color spectrum to another color spectrum, area shape of color and pixel density, boundary distance between one color spectrum to other, and location of a given color density pixel. Usability criterion are based on, for example, knowledge of a type of core, type of casing, well depth, reservoir conditions, type of reservoir, and core handling/transport process.

If it is determined that an enhanced image is useable, method 100 proceeds to 112. However, if it is determined that the enhanced image is not usable, a subsequent determination is made as to whether the enhanced image can be further enhanced to make the enhanced image useable. If it is determined that the enhanced image can be further enhanced (110a), the enhanced image is returned to 104 for further image enhancement. If it is determined that the enhanced image cannot be further enhanced to make the enhanced image useable, the image is discarded (110b). If discarded, after 110b, method 100 typically stops with respect to at least the particular enhanced image, but proceeds with any remaining useable images. In some implementations, method 100 can generate a notice that a particular enhanced image is either fixed or discarded. In some implementations, data with respect to discarded images can be retained to permit further processing of the discarded image or use of any data associated with the discarded image, if desired. For example, the discarded data may not be useable for one type of petrophysical property (for example, porosity), but may be useable for another type of petrophysical property (for example, wettability).

At 112, image segmentation operations are performed on the enhanced image to partition the enhanced image into coherent regions with respect to some particular criterion or criteria (for example, an image-based criterion, such as a range of pixel density or forms and structures within the enhanced image). The quality of image segmentation is an important factor contributing to the accuracy of inferred petrophysical properties of a hydrocarbon reservoir. In some cases, an image reaching 112 can have some or all the operations of 114a-114f applied against the image resulting only in one image passing to 116. In other cases, some or all the operations of 114a-114f can be applied against the image resulting in more than one image passing to 116.

A particular useable image can have one or more image segmentation techniques/combinations performed against it. Image segmentation techniques can also be performed in different orders. The number of image segmentation techniques performed or the order of image segmentation techniques can vary depending on the useable image format, size, or any other criterion/criteria consistent with this disclosure. For example, depending on the useable image determination at 108, a first order of application of image segmentation techniques could be 114a, followed by 114d, followed by 114c, and 116. In another example, a second order of application of image segmentation techniques could be 114a, followed by 114e, followed by 114b.

Figure 1B:
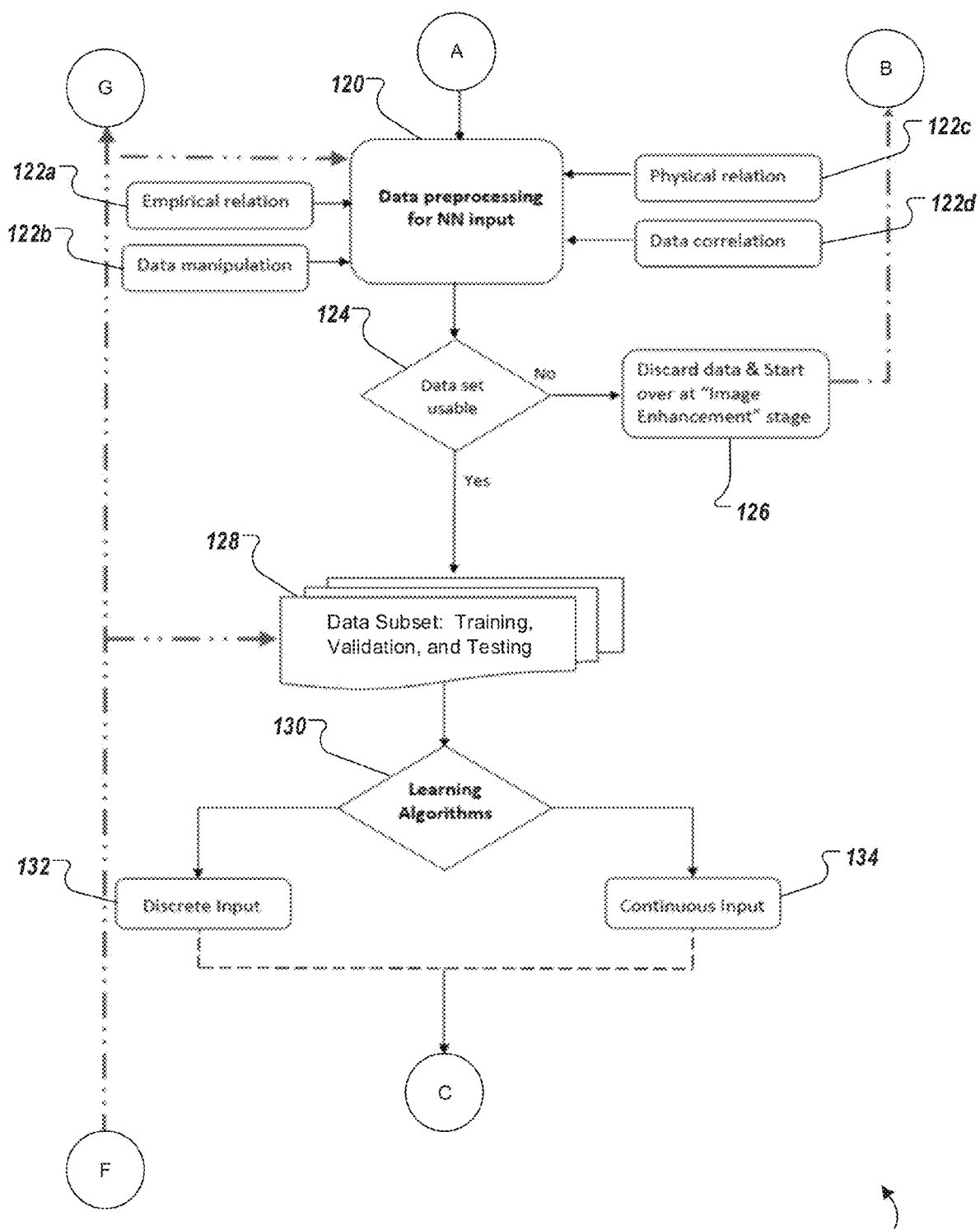
Figure 1C:
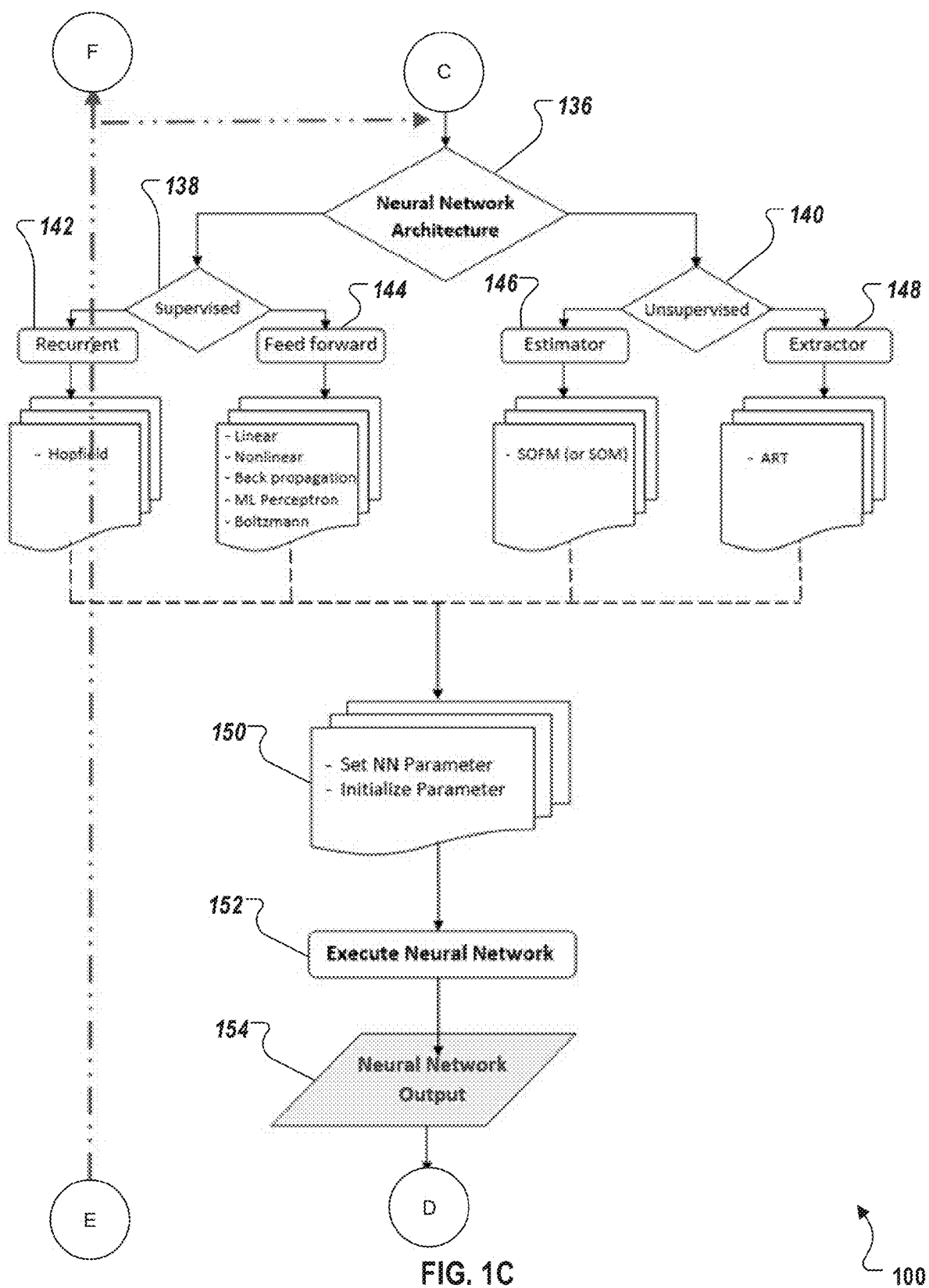
Figure 1D:
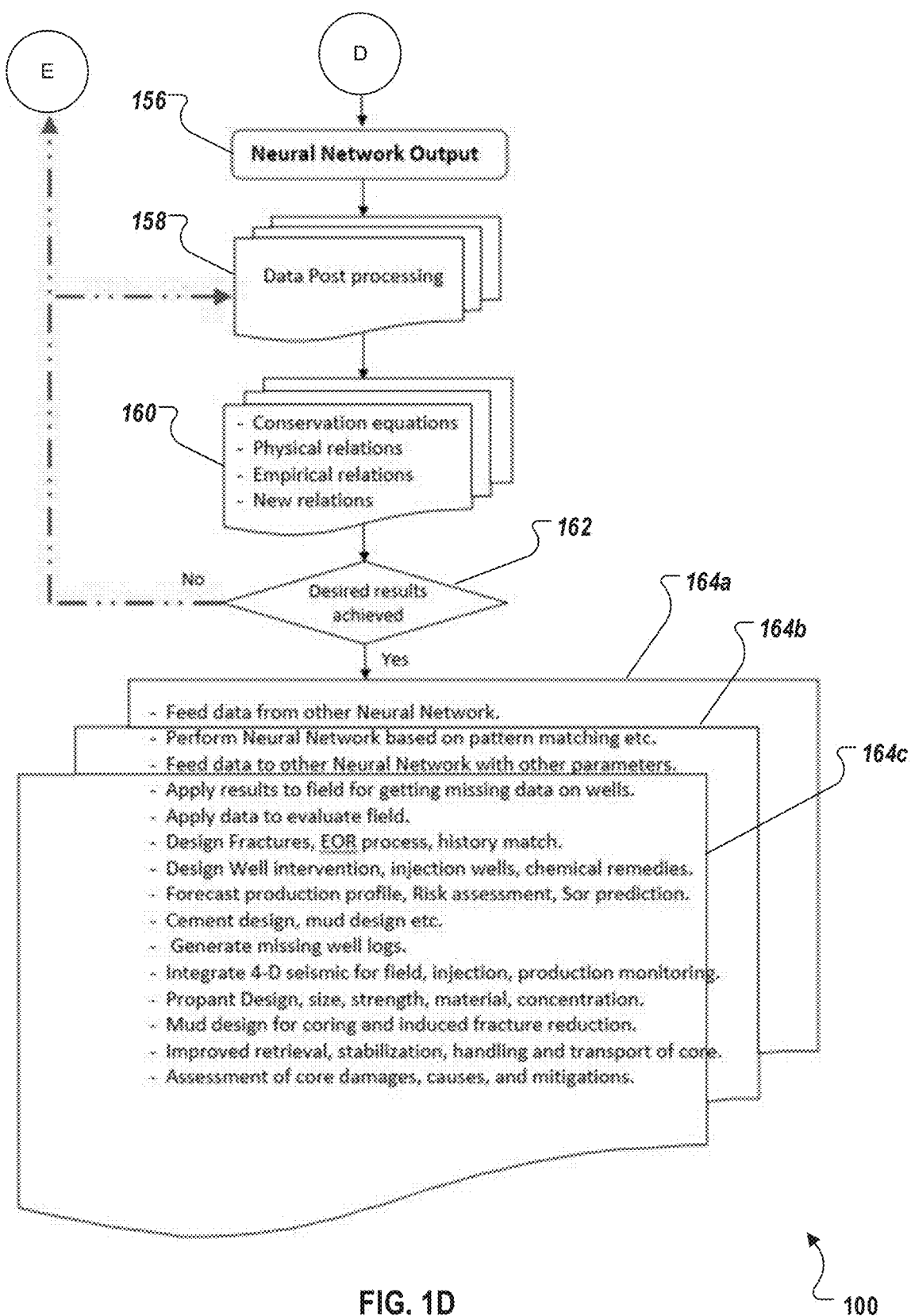

In some implementations, orders of application of image segmentation techniques/combinations are dependent on output from 108 and a required end result in 164a, 164b or 164c (or any combination of 164a, 164b, and 164c) as described with respect to FIG. 1D. For example, different types of data sets are ultimately generated by method 100 based on required results in 164a, 164b or 164c (such as, for 164a, the output of 112 could be another image; for 164b, the output of 112 could be a combination of an image and alphabetical classifications; and, for 164c, the output of 112 could be a combination of alphabetical classification along with a set of numerical constants and arithmetic/geometric relations). Any petrophysical property deduced from method 100 can be considered to be a required result. The required result can be further considered to be an end result or can be combined with another set of images and used as input to a NN at 104. In some implementations, example of required results can include, but are not limited to, a density variation of a rock matrix and fluids, a change in a shape of a rock matrix, pores or fluids in the pores, a change in a location of a specific fluid in a specimen with respect to other fluids, a change in a shape of pores, and a change in an area of pores occupied by a fluid.

Note that, from 162, once a desired result is received, that desired result can be considered a standalone value or be combined with another value to be used as an input with a second set of images/data at 104 to obtain further results. For example, there could be multiple sets of images for a given specimen based on various stages or modifications (tests) the specimen has been subjected to. In this case, results from 162 of a first execution of method 100 could be used as input with other images at 104 for a second execution of method 100.

As illustrated, example image segmentation operations can include, but are not limited to, image cropping 114a (for example, used for dissecting an image to separated various part of an image in to usable and background image), region of interest 114b (for example, used to isolated various parts of an image based on criterion, such as range of pixel density), edge detection 114c (for example, used to understand boundaries between features within an image), thresholding 114d (for example, used to isolate various frequency with the color spectrum), histogram binning 114e (for example, used to categorized various items/area in the image based on its occurrence and location of the occurrences), and morphologic 114f (for example, used to study the forms and structure within an image for specific structural features). Other image segmentation techniques can include, for example, Eigen vectors, key point detections, scale space, feature-matching, displacement estimation, or any other image segmentation technique consistent with this disclosure.

An example color base image segmentation equation can include:

$$I(RGB)=(FR,FG,FB);$$

$$Y=\alpha Fr+\beta Fg+\gamma Fb \qquad (4),$$

where the example equation (arithmetic/geometric relation) could be established based on the output from 116 or 164. In this example, a color image (I) has been evaluated for a bench mark color spectrum of Red-Green-Blue. A constant $\alpha$ represents a base value of the color red in the image, constant $\beta$ represents a base value of the color green in the image, and constant $\gamma$ represents a base value of the color blue in the image. In Equation (4), constants $\alpha$, $\beta$, and $\gamma$ are considered to be dimensionless quantities. Constants $\alpha$, $\beta$, and $\gamma$ are derived from an image by operations at 112, and the results are checked against a possible range of each constant at 116/164. The result from 116/164 provides a set of numerical values for constants $\alpha$, $\beta$, and $\gamma$. Once values for constants $\alpha$, $\beta$, and $\gamma$ have been established, the Equation (4) can be considered an empirical equation and used for other images from similar core/well data without the necessity of using the NN, or Equation (4) can be used to screen images at 102. If a petrophysical property can directly be inferred from the colors of an image, then the empirical Equation (4) could be applied to image colors to derive a specific petrophysical property. The goal is that, after performing multiple NN data processes (for example, hundreds or thousands), empirical equations can be generated that predict a given petrophysical property for a given set of image criterion. For example, constants $\alpha$, $\beta$, and $\gamma$ can are calculated using images with known values to calibrate Equation (4) based on, for example, a type of rock matrix, the rock matrix physical condition, and fluid saturation. Constants $\alpha$, $\beta$, and $\gamma$ can be used in empirical Equation (4) for other sets of images from oil reservoir rock with the same or similar core (rock).

In some implementations, image segmentation includes: 1) edge-based segmentation (for example, including parallel edge detection and sequential edge detection) and 2) region-based segmentation (for example, segmentation as function of hue, segmentation as function of saturation, segmentation as function of spatial attributes, segmentation as function of orientation, and segmentation as a function of neighbors pixel attributes). Further, region-based segmentation can include one or more of a watershed method, mean-shift method, region growing, region splitting, split and merge techniques, or any other region-based segmentation method consistent with this disclosure. For example:

Cooperative segmentation: 1) embedded integration and 2) post-processing integration. In some implementations, 114a-114f are used by 112 in various combinations. For example, cooperative segmentation can be used in situations related to shading or differentiating fine structure with a scan. Embedded integration can be used to avoid errors in segmentation on the basis of region and edges. Post-processing integration is the criterion that 112 will try to reach using 114a thru 114f.

Similarity based: In some implementations, 112 will use 114a-f based on some criterion related to similarity to an attribute (for example, a basis of segmentation is similarity to some attribute color or intensity)

Discontinuity based: In some implementations, 112 will use 114a-f to find a discontinuity based on, for example, pixel, shading, intensity, or boundary. An example could be that a basis for segmentation is an abrupt transition in intensity level in an image.

With respect to region of interest 114b image segmentation, a region of interest analysis can be used to separate casing (barrel), foam, core material and other outliers in the enhanced (and possibly further segmentation-processed) image. A ratio analysis can be performed to make sure the region of interest separation represents the three materials (and any unknown outliers) correctly (note that the region of interest 114b process requires knowledge of physical properties and dimensions of a barrel, foam, and core).

With respect to edge detection 114c, edge detection can be used to extract useful information from an enhanced (and possibly further segmentation-processed) image to be used, for example, in porosity prediction from a well core CT-scan image. Typical edge detection techniques include, for example, the Sobel, Laplacian, Canny, and Hough transform. Any single technique or a combination of two or more edge detection techniques can be useful in providing processed image data for NN input.

With respect to thresholding 114d, thresholding (histogram) can be utilized to extract information (for example, a specific feature) needed from the enhanced (and possibly further segmentation-processed) image. For example, with respect to porosity, two major forms of thresholding operations are typically conducted: 1) providing a quick classification of porosity based on range and 2) and specific processing for each section of the core as a function of depth. In typical implementations, various thresholding routines can be used, including, but not limited to, gray-level thresholding, OTSU's method (a method named after Otsu Nobuyuki and used to automatically perform clustering-based image thresholding, or, the reduction of a grayscale image to a binary image), local adaptive thresholding, color/region-based thresholding, and supervised/unsupervised thresholding.

Thresholding adds value to an overall analysis and prediction by providing a very clear contrast for various boundaries between grains (for example, in sandstone) and spaces in between grains. This could be used for classification to distinguished solid and fluid material within a well core for a quick range outcome of petrophysical properties. Another use includes comparing data with calibration data on a known image to obtain detail of volume information for solid and fluid materials. The solid and fluid materials can further be divided to pinpoint quantitative values of mineral and fluid saturation of not only reservoir fluids but invasive fluids.

With respect to histogram binning 114e, histogram binning can be used in the enhanced (and possibly further segmentation-processed) image to determine a range of limits, such that, between each set of limits in the range of limits, the values will have a different meaning. While histogram thresholding can be used to differentiate between various "objects of interest" within an image, for each of the "objects of interest" that have been discovered, histogram binning can be used to determine groups, gradients, and variations within each object of interest and amplitudes of the determined groups, gradients, and variations.

With respect to morphologic image segmentation 114f, morphologic image segmentation can be used to aid in texture-based isolation of the enhanced (and possibly further segmentation-processed) image. Along with helping with porosity measurements, the morphologic image segmentation 114f can be used for determination of pore size distribution, pore throat size and distribution, and grain size distribution. Typical morphologic image segmentation methods can include, for example, binary dilation and erosion, set-theoretic interpretation, cascading dilation, and rank filters.

In general, Neural Network can utilize NMR, CT-SCAN and petrology data to predict pore throat type (size), number of pore throat of a given size and their connectivity to pores. The processes can use the available data from various tests to generate same results as currently being generated with the destructive test. Additionally, the MICP (destructive test) can be conducted on less than 0.1% of the core material and may not provide the whole picture for the rest of 99.9% of core material, whereas Neural Network method can, for example, provide "Pore Throat" information for the whole 100% of the core and can further be extended to whole reservoir, once integrated with well logs and basin models. The data can then be further process thru other neural network routines associated with this patent to generate capillary pressure curves.

In some implementations, Neural Network algorithm can integrate not only chemical composition for rock and fluids but also their spacing, location and placement of for rock-fluid material within the reservoir. For this purpose, utilizing NMR, CT-SCAN, Thin section, XRD, fluid chemical composition along with routine electrical property and capillary pressure test can predict hydrocarbon presence. The final product can take as input well-log data, fluid composition, petrology etc. and pass it thru trained Neural Network to predict possibility of non-water based fluid (hydrocarbon).

In some implementations, Neural Network can account for the polarity of component in rock matrix as well as fluids with these rock matrix and developing a Neural Network model to predict wettability as function of composition (rock-fluid). For this purpose, some experiments can the existing wettability test to a next level to understanding effect of chemical composition of rock-fluids by stepwise fractional removal of fluid layers off of the rock matrix. The expected outcome is a trained Neural Network algorithm that takes in rock and fluid composition along with pore and pore throat size to predict wettability and residual oil saturation. Additional benefit of compositional based model will be to evaluate effect of various fluids that are introduced into the reservoir during various stages of well development and production and improved fluid design to minimize their adverse effects.

Other image segmentation techniques could include: 1) linear segmentation (for example, used for separability and shift analysis, image aliasing and two-dimensional (2D) convolution) allows for a set of data that can complement other data generated through other segmentation techniques to provide input to a NN prediction routine; 2) template matching segmentation (for example, used to help in porosity estimation and identifying similar structures in the well core to provide homogeneity information useful for further petrophysical characterizations as many petrophysical properties are vector based—that is the value of a property (such as, permeability) changes based on a direction); 3) feature and space clustering; 4) region based; 5) edge detection approach; 6) spatial split and merge techniques; 7) color-based (such as RGB, hue-value-saturation (HVS), and hue-saturation-luminance (HSL)) techniques; 8) fuzzy and NN techniques in various combinations; and 9) physics-based segmentation techniques to provide a set of data for further analysis to provide qualitative, quantitative, or both results for required petrophysical information.

As will be appreciated by those of ordinary skill in the art, the described image segmentation techniques are provided for example purposed to aid in understanding of the described techniques. Image segmentation techniques are not limited to only the described techniques, but to any technique consistent with this disclosure. From 112, method 100 proceeds to 116.

At 116, a determination is made whether the resultant enhanced image meets usability criteria. The output from 112 possesses a set of values compared to a benchmark or standards provided to 116 based on 102 and 164. Note that at 102 or 164, an expected range of output from the images is known as training of the described NN is performed with images of specimens with known petrophysical values. While the NN is provided with images for which petrophysical values are unknown, the training provides a range within which resultant values should fall. For example, if it is expected that a combination of 114*b* and 114*c* should provide an area value between 250 and 650, anything outside these limits will be considered undesired results from 112. Similarly, if an expectation of values is a range of 5-25 for a combination of 114*d* and 114*e*, if the actual value is less than 5, it is discarded (118*b*), but, if greater than 25, it can be fixed (118*a*).

If it is determined that the segmented image meets usability criteria, method 100 proceeds data pre-processing for NN input 120 (FIG. 1B). However, if it is determined that the segmented image does not meet usability criteria, a subsequent determination is made as to whether the segmented image can be further segmented to make the segmented image meet usability criteria. If it is determined that the segmented image can be further segmented (118*a*), the segmented image is returned to 112 for further image segmentation. If it is determined that the segmented image cannot be further segmented to make the segmented image meet usability criteria, the segmented image is discarded (118*b*). If discarded, after 118*b*, method 100 stops with respect to at least the particular segmented image. In some implementations, method 100 can proceed with remaining useable images. Similar to the discussion in 108, in some implementations, method 100 can generate a notice that a particular segmented image is either to be fixed or discarded. In some implementations, data with respect to discarded images can be retained to permit further processing of the discarded image or use of any data associated with the discarded image, if desired.

The described methodology can also use the NN to analyze auxiliary data. The auxiliary data can include laboratory, field, or other data that is usually discarded after collection due to an apparent lack of applicability to any theorem, physical/engineering law, calculations, or established equation/relation (such as, the Darcy or Archie equation). The auxiliary data can include, for example, data used in petrophysical analysis or medicine. Any other auxiliary data consistent with this disclosure is considered to be within the scope of this disclosure. For example, data for an unsteady state, relative permeability test can include incremental production due to a: 1) change in rate of fluid injection; 2) change in stress; 3) change in temperature; 4) reaction between fluids; and 5) reaction between rock and fluids. This data can be input to the NN for processing (for example, at 120).

Between 112 and 120, data collected through various segmentation techniques is then subjected to further initial conditions, boundary conditions, physical models, chemical models, and combinations of petrophysical relations before used as input to a NN to predict desired results. For example, output from 112-116 fed into 120 is not necessarily one output but multiple outputs (for example, an image "Image-1" could have gone thru 112, where 114*a* and 114*c* generated "shape-1" data; 114*b*-114*c* provided "size-1" information; 114*d*-114*b* provided information about "types-1" of region based on shading; and 114*e*-114*d* could provide "amplitude-1" of each shade along with a "range-1" within each shade.

At 120, useable data from 116 is pre-processed for NN input. In typical implementations, pre-processing techniques can include, but is not limited to, one or more of a set of arithmetic/geometric relations (for example, empirical relations 122*a*, data manipulation 122*b*, physical relations 122*c*, and data correlation 122*d*). For example, for "Image-1" data, "size-1" and "types-1" could be used with an empirical relationship (for example, at 122*a*) for porosity, grain size, or both; "shape-1" and "amplitude-1" could be used with physical relation (for example, at 122*c*) or with data manipulation (for example, at 122*b*) to group data for saturation (fluid); and a region of interest verses (vs.) total area of the image can be correlated to obtain porosity values (for example, at 122*d*). Here, 122*a*, 122*b*, 122*c*, and 122*d* would be a correlation or equation provided based on standard laboratory or well site petrophysical, chemical, or other analysis of known samples.

The goal of the described methodology is to use less than one percent of the well core and fluid samples to predict one-million percent. In other words, use 100 percent of a well core sample to extrapolate to the overall reservoir (the one million percent). The laws of physics and deterministic equations available are separate for each field (for example, phase behavior and geochemistry relations could not be used with a petrophysical relation to predict reservoir properties, whereas fluid properties, geochemistry, geology, sedimentology, petrophysics, and stresses all effect a reservoir simultaneously. A change in any one effects all the others.

Additionally, while performing laboratory tests on wellsite field data acquisition, there are additional sets of data collected, which are relevant but are currently not be used for analysis due to limitations of deterministic relation-based laws associated with each individual discipline. For example, during electrical properties tests that are used for reserve estimation, there is information related to rate of production as a function of time. This data is not utilized—instead, only equilibrium values are used. For example, out of one thousand data points, only one data point is used as the Archie equation has no terms for the other data points. If the rate data could be used to predict permeability, and if it is combined with a chemical composition of hydrocarbon, this additional data can be used to help mitigate issue with sweep efficiency.

With respect to empirical relations 122*a*, the data gathered from image processing and segmentation is then introduced to various empirical relations based on physical properties of a specimen under consideration and desired required results. For example, porosity can be a function of a color bandwidth, spatial coordinate, saturation, intensity of a specific shade, and size/location of specific regions. In some implementations, existing petrophysical empirical equations can be used with data generated from NN analysis to generate/derive one or more empirical equations (for example, as a function of rock type and saturation of the rock type). Similarly, permeability can be described as a function of all the previously mentioned factors along with calculated porosity value. In typical implementations, the porosity value can be calculated from color bandwidth, spatial coordinate, saturation, and intensity of a specific shade. The calculated porosity value can then be used with reservoir fluid properties from laboratory data collected on fluids, geological data, mineralogical data, or other data to predict permeability.

In some implementations, data manipulation 122b can be in the form of a normalization of all the data with maximum (max)/minimum (min) values or in the form of integration of the data over a known time/space or derivation of data with respect to time/space. For example, a rate of change could be applied to set of data to determine strength as a function of depth, porosity and fluid saturation. Physical relation 122c can indicate physical relation effects (for example, porosity reduces, fluid saturation reduces, and mechanical strength increases given that a density of a matrix material remains same or increases). Data correlation 122d can be used to indicate possible data correlations (for example, the red in a color spectrum could be related to reduction of fluid saturation and brittleness of rock, so various values with a red color spectrum can be correlated to both saturation and rock strength). From 120, method 100 proceeds to 124.

Consistent with the previous description at 120, Data manipulation 122b can utilize laboratory or field data collected as auxiliary data but not used for petrophysical analysis because the collected auxiliary data is not applicable to any theorem, physical/engineering law, calculations, or established equation/relation (such as, the Darcy or Archie equation) used in petrophysical analysis. An example of laboratory or field data can include: 1) number of days between the taking of a core at well site (field) and laboratory tests; 2) data from a failed (unsuccessful) test; 3) time required to clean and prepare a test sample for a specific test; 4) type(s) of instrumentation used to perform the test; 5) calibration information data for an instrument; 6) limiting parameters of instruments, tools, and data collection methods; and 7) data concerning various physical, temperature, pressure, and environmental conditions a sample experienced before and after a test.

In some implementations, the described NN described can be configured to work with data that is considered to be offline, online, or a combination of both. Offline data can include previously-generated and collected data/images supplied to the NN at a later point in time for processing, as illustrated in FIGS. 1A-1D. Online data can include data/ images supplied to the NN on a continuous basis (such as, data/images generated continuously in real-time or substantially real-time by equipment in a laboratory or field environment) for processing, as illustrated in FIGS. 1A-1D.

At 124, a determination is made whether the resultant pre-processed data for NN input meets usability criteria. For example, at 120 the desired objective at 164a, 164b, or 164c is to calculate only one property from the images (for example, porosity of "Image-1"). From 116, data is received for "Image-1" on three different shades of gray, five different shape categories, one-hundred different regions of interest, and twenty area sizes associated with these regions of interest. An empirical relation (122a) can be applied based on one shade of gray with five shape categories to calculate three sets of porosity data; a physical relation (122c) can be applied on the physical attributes of shape and size to calculate a porosity value; correlating region of interest vs. total area of the image can be correlated (122d) to obtain porosity values; and a manipulation of 122a and 122c with three shades of color can be performed to generate a set of porosities. Is processed at 124 to determine usability of the data set. Usability of the data set can be determined by whether the result of 124 conforms to a limit/range of a specific target output parameter.

If it is determined that the pre-processed data (the data set) meets usability criteria, method 100 proceeds to data subset; training, validation, and testing at 128. However, if it is determined that the pre-processed data does not meet usability criteria, the pre-processed data is discarded and method 100 returns to image enhancement at 104 where the conditions/criterions for one or both of 106a or 106d can be modified. Here, method 100, starts with another image. In some implementations, method 100 can keeps track of the discarded image pre-processed for NN input to permit further processing of the discarded image or use of any data associated with the discarded image, if desired.

Continuing the prior example, values of porosity generated from 122a-122d can be compared to benchmark values for the entire "Image-1." If the values are within a particular range, then method 100 proceeds to 128 (the data is moved to a NN engine). If the values are not within the particular range, then the data is discarded at 126 and the process returns to and starts over at 104 (image enhancement). For example, a benchmark value for "Image-1" can be that 1-5% of porosity can be nano-porosity, 60-70% can be micro-porosity and 25-40% can be macro-porosity. If these conditions are met, then data is useable. If not, then discard the current image and start over with a new image.

At 128, the NN engine receives the determined useable data from 124 for training, validation, and testing. The received data is divided into three subsets (that is, training, validation, and testing data subsets). If porosity it taken as an example for a final product at 164, if there were one-hundred images at 102 and twenty unique data sets generated for each image, at 128, the data from 100 images will be divided into the three subsets: 1) data from fifteen images for training (15%); 2) data from ten images for validation (10%); 3) and the rest of the data from 75 images (75%) for testing accuracy of the NN. A percentage division is determined based on a number and type of a data set derived from the result of the described image segmentation (for example, received determined useable data from 124). In typical implementations, the smaller the data size, the larger the data set for training and validation is required to be (and vice versa). If one of the data sets within the twenty unique data sets for an image has a known value of porosities against which training, validation and testing is carried out by 128 to generate a set of algorithms/relations, the generated algorithms/algorithms are then passed to 130 to be used either in 132 (batch processing) where a set of data from a set of core images for which porosity is unknown are provided to predict porosities, and the algorithms/relations from 130 are passed to 134, where a continuous stream of processed images are fed (such as, from an instrument scanning cores and generating images) and porosities are predicted. Note, image data with unknown porosity that is fed to 132 or 134 will have gone through previously described steps of 102 to 124 so that the data is in the same format and subsets, that can be utilized by the algorithm in 130 to predict porosities. If images/data are obtained from a continuous source (such as, if the NN is receiving input from an instrument performing a test then it is a continuous input, while if images/data are obtained from a previously collected set of data it is considered to be discrete input. From 132 or 134, method 100 proceeds to 136 (FIG. 1C).

At 136, a determination is made as to what NN architecture is desired for use in processing the data from 132/134. If there is sufficient set of output data available to train the NN, method 100 proceeds to 138 (supervised mode). If, however, there is none (or not enough) training data available to train the NN, then method 100 proceeds to 140 (unsupervised mode). For example, a set of data collected in a laboratory or in the field could be used in a supervised mode, whereas continuous data could be used for classification in an unsupervised mode.

For the described processing, a NN is an ideal type of mathematical processing scheme for at least the following reasons:

1. Extremely large data sets for processing,
2. Data pertaining to well cores and reservoirs has been collected over decades and can provide an excellent history matching opportunity form model vs. reality,
3. The inexpensive supply of data and fast computing engines/continuously improving statistical approaches. The supply of available data is extensive as there have been millions of wells drilled for which a well core has been scanned and images made available at various private and governmental entities. The described algorithm from 102 to 128 can easily be executed on a high-end, off-the-shelf computer and does not require supercomputing or specialized computer hardware/software,
4. Available physical models are not capable of leveraging all the available data and are limited to very narrow sets of inputs (for example, a permeability equation is typically limited to a test on a 1.5 in well core specimen in a controlled environment and a function of flow rate/delta pressure). The Darcy equation used to calculate permeability of a core is based on a flowrate of the fluid passing thru a core sample of known diameter and length, where pressure at the inlet and outlet of the core is measured. The limitation is that the cylindrical sample used to perform the tests to obtain permeability represents less than 0.1% of all the core material imaged and available and only two variables, whereas an image analysis as described in this disclosure leverages the entire collected well core (for example, 300-3000 ft.), and
5. Physical models have many integration issues when attempting to upscale from lab data to field data (for example, attempting to integrate data on a 1.5 inch diameter core to million cubic feet of actual reservoir formations).

The NN architecture can be first divided into either a supervised 138 or unsupervised 140 NN. For a supervised 138 NN, types can be divided into either a recurrent 142 (for example, a Hopfield configuration) or feed forward 144 (for example, linear, non-linear, back propagation, ML perception, and Boltzmann) type of NN. For an unsupervised 140 NN, types can be divided into estimator 146 (for example, self-organizing feature maps (SOFM) or self-organizing maps (SOM)) or extractor 148 (for example, adaptive resonance theory (ART)) type NN.

Regardless of type, a NN is designed to mimic and process information in parallel instead of serially, as in typical computer processing. As a comparison, serial processing for performing petrophysical analysis work can manage a maximum of 2-3 properties, which poorly processes virtually unlimited amounts of information using limited physical models. In a parallel processing NN, since NN models are not predefined, the NN's work on very simple principles to "learn" from a given data set and to predict very complex behaviors given the data set.

Figure 2:
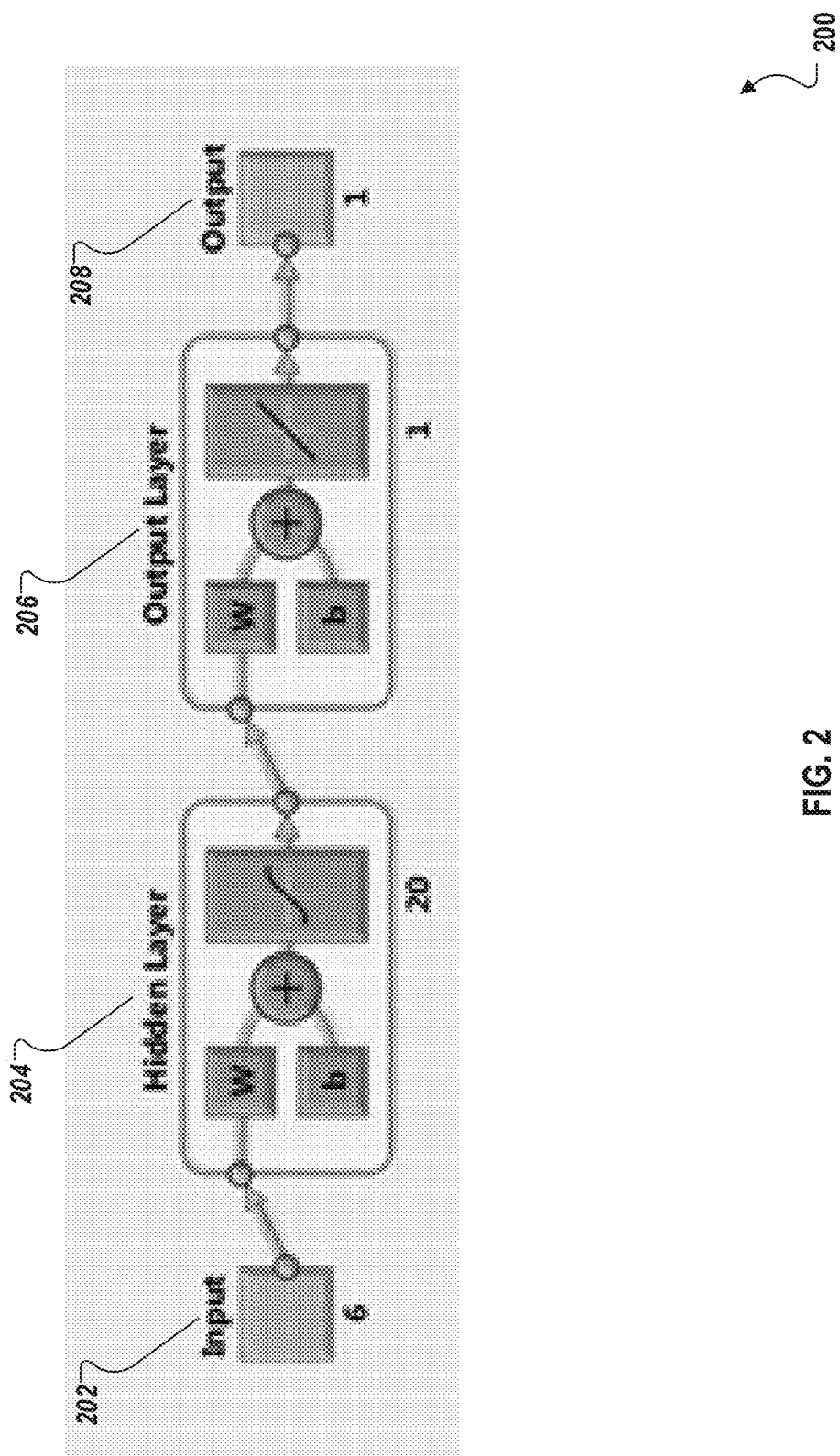
FIG. 2 is a block diagram representing the basic structure of a NN, according to an implementation of the present disclosure.

Turning to FIG. 2, FIG. 2 is a block diagram representing the basis structure of a NN 200, according to an implementation of the present disclosure. The basic structure of illustrated NN 200 includes three layers. In a first layer, an input layer 202, data is presented to the input layer 202, normalized into a particular format for use by the NN, and passed to a hidden layer 204. The hidden layer 204 is the inner working of a NN—effectively acting as a "black box" that once trained with a set of known values of input and expected output, generates relations and algorithms that are internal to the NN. Hidden layer 204 results are passed to an output layer 206. The output layer 206 generates sets of output data 208. As the NN 200 is a parallel process, all available inputs can be passed to the hidden layer 204 simultaneously. The inputs from input layer 202 are presented to the hidden layer 204 using weights that are altered to obtain a best matched output 208 for a given set of inputs.

Returning to FIG. 1C, in a feed-forward NN (for example, 144, FIG. 1C), information flow is in one direction only (that is, data is supplied to the hidden layer through the input layer and results appear in the output layer). Data is presented to the NN in the form of activations in the input layer. As previously described, data is pre-processed for a given set of petrophysical evaluations. Similarly, output from the NN is processed to obtain final results of method 100.

At 150, a data set in the same format as output from 132 or 134 is received from 136 along with a selection (an initialization parameter—supervised/unsupervised and type) of what type of NN has the user selected (138-(142 or 144) or 140-(146 or 148). From 150, method 100 proceeds to 152.

At 152, the selected NN is executed using/against the data set. From 152, method 100 proceeds to 154.

At 154, output from the NN is generated. If the output is the final product, for example if porosity is the only desired outcome, then the output from 154 can have a format of "Image-#", "Porosity Value." From 154, method 100 proceeds to 156 (FIG. 1D).

At 156, output for a particular image from 154 is held in a staging area until all of the output for all the useable images is completed. From 156, method 100 proceeds to 158.

At 158, the NN output for all the useable images is post-processed. For example, assigning depth (feet) for each image. For porosity, method 100 ends at 158 because no further petrophysical data is needed at this point. For example, when an entire well core is received and the task is to differentiate reservoir rock from non-reservoir rock, porosity will be the deciding factor. For other petrophysical properties (for example, permeability) to be output as desired results at 164a, 164b, and 164c, method 100 proceeds to 158, 160, and 162.

At 160, data from previous processing can be further processed (such as, normalized or compared). An existing equation/relation can be used to derive other petrophysical properties (for example, a porosity and saturation value could be used to derive a reservoir macro-micro reserves estimate). Additionally, new relation (data relationship) can be derived (for example, by combining data produced from the NN with existing data from a sister well). Here, all the processes under a supervised and an unsupervised NN (140, 142, 144, 148) are established NN algorithms that can be used to achieve various outputs desired from a set of data or applying these algorithms can generate a new way of looking at the data produced by the NN before 136. For example, for a specific parameter based on a specific set of data input, a different set of data from another NN analysis can be used as an input to obtain better results. As a particular example, when performing flow analysis of a reservoir fluid through a formation rock, input data includes pressure drop and saturation. A first NN can take this data along with a CT-scan image of the rock and generate a flow model-1. A second NN can generate a model-2 of stress and strain associated with a reservoir as a function of pressure drop. These two NN outputs (that is, model-1 and model-2) can be combined and used as input to a third NN that combines the effects of pressure drop and changes in stress to predict flow. Similarly, the same logic could be extended to other parameters of interest to generate additional models using a NN and then combining the additional models for different responses. One particular value/use of this methodology is the ability to leverage legacy data sets in the petroleum industry, each data set with specific limitations, and to provide an improved over all view of the available data. For example, there exists porosity data sets collected over the life of a hydrocarbon recovery field, but the methods used to collect the data sets varied over time and with different techniques and conditions. This variation resulted in data sets that deviate in various dimensions particular to the different techniques and conditions used to collect the data sets. Using the described NN methodology, the legacy data sets can be input along with the different techniques, conditions, and variations and used to predict an improved/desired resultant value(s). From 160, method 100 proceeds to 162.

At 162, if the results achieved satisfy a desired outcome, method 100 need not continue, but if the results are to be combined with other data to be fed to another NN (for example input at 150) then 164a, 164b or 164c could be an entire set of NNs for which results from 162 are treated as an input. For example, if the output from 162 is porosity, permeability, and variation of porosities (such as, micro-macro), the data could be fed to another NN along with an experimental pressure drop for CO2 flooding to train the NN to predict a CO2 flow pressure drop over an area of cores that have images but not CO2 test results. Whether or not achieved results are a desired outcome is typically determined by a user of the process (that is, if the data generated at 162 is expected and usable for successive processing stages). In these situations, for example, the data can be plotted and a determination made if the data is within a limit of usable output limits. If a human user makes this determination, the user typically must be well-versed in the petrophysical data under consideration and the well/field under study to make an informed determination. In other implementations, an automated process (for example, a software comparison engine, NN, or other process) can be used to make the determination whether the data generated at 162 is expected and usable for successive processing stages. In some implementations, the automated process can provide a recommendation to a human user, while the human user makes the final determination.

At 162 output data is be compared to a known/determined range associated with the output data. In some implementations, method 100 can perform successive levels of returns to earlier stages of processing if result data is not satisfactory. For example, if it is determined that less than a required set percentage accuracy (for example, 80%) of the output data is not within the range, the data is returned to 158. Method 100 will return to 136 from 162 if, after a set number of iterations (for example, three), processing between 158 and 162 does not achieve the required set percentage value accuracy. Method 100 will return to 128 from 162 if, after a set number of iterations (for example, three), processing between 136 and 162 does not achieve the required set percentage value accuracy. Method 100 will return to 120 from 162 if, after a set number of iterations (for example, three), processing between 128 and 162 does not achieve the required set percentage value accuracy. Method 100 will return to 112 from 162 if, after a set number of iterations (for example, three), processing between 120 and 162 does not achieve the required set percentage accuracy required. Method 100 will return to 104 from 162 if, after a set number of iterations (for example, three), processing between 112 and 162 does not achieve the required set percentage accuracy required. Once all return attempts have been attempted and satisfactory results have not been achieved, method 100 will stop to prevent infinite loop or other undesirable processing. From 162, method 100 proceeds to 164.

At 164, result data can be used for different purposes. For example, data from 164a can be used as input for another NN, data from 164b can be converted into images and used as input for another NN, and data from 164c can be used as input for another NN or for simulation-type software to model and to predict various parameters as required.

Back-propagation is the most commonly used feed-forward NN model, and requires a training set of data to train the NN, a validation set of data to confirm the NN is providing desired results, and new input data to predict results. A back-propagation NN works on the principle of reducing error in output by adjusting weights associated with the input (for example, using a gradient descent). Other alternates to the back-propagation method include, but are not limited to, Hebbian learning, reinforcement learning, and artificial evolution.

To calculate porosity utilizing a back-propagation NN is described here as an example. At a high-level and consistent with the previous explanation, a set of CT-scan images for core plugs (for which porosity and permeability data was available) can be first subjected to image pre-processing (for example, 104 of FIG. 1A) to prepare the plugs for image segmentation (for example, 112 of FIG. 1A). The plug images are then segmented for color, hue, saturation, gradient, value, texture, and spatial coordinates. The data set is divided into training, test, and prediction data sets.

The back-propagation NN supplied with the set of training data, and then tested with test data set until error is minimized to within determined tolerable limits (for example, for porosity values the tolerable limit should be between 5-25). Once the NN is trained and tested, the NN is utilized to predict data for both known and unknown sets of data for porosity.

In the case where training and test data set fail to minimize error (for example, at 128), recalibration of input data can be performed, usually through image enhancement 104 of data after the image segmentation step 112. If this does not work, then image segmentation 112 is visited and a different technique is employed to segment the image to obtain updated input data. The process can be repeated, starting from initial image enhancement 104, to achieve required results to train a particular NN model. Once a NN is trained, it can be saved and used for new input data. Similarly, these steps can be tasked to predict other petrophysical properties from a set of CT-scan images of a well core. One such analysis is now presented as an example. A MATLAB platform was used for coding, analysis, and a NN.

FIGS. 3A-3C, illustrate a table 300 representing usable data following image enhancement and image segregation (input data for a selected NN), according to an implementation of the present disclosure. The table 300 represents the result from 116 once images have passed thru 102, 104, 108, and 112. The data from FIGS. 3A-3C is fed into 120.

FIGS. 4A-4C illustrate a table 400 representing known data values (target data for the selected NN) of porosity for each processed image, according to an implementation of the present disclosure. The data can be used as input in 128 for the NN.

FIGS. 4A-4C illustrate a typical set of data based on nuclear magnetic resonance (NMR) porosity measurements. Based on the calibration of the NMR-Instrument, the instrument will average out and provide the same values for porosity when the same set of samples are exposed to various laboratory fluids and NMR porosity is measured after each process. Even though the sample has been exposed to different processes (for example, different fluids), since the calibration was done with a base fluid(s), the NMR results remain identical and, as such, do not represent actual data.

Information related to the processes performed on the sample(s) along with NMR data at 120 thru 122a, 122b, 122c and 122d allow obtaining a value of porosity that is not only dependent on what the NMR instrument provided with only one set of base calibrations, but to provide an actual value of porosity that is variable as a function of a fluid.

Once we have an NMR porosity corrected for the process that the sample has gone thru, that porosity than can be combined with other results (say pore throat sizing form Mercury Injection test) and then can be up scaled to field NMR logs to infer more than just porosity from these logs.

In the example and consistent with the previous description, CT-Scan images of a well were subjected to image analysis process steps to perform segmentation of enhanced images (here, 102; 104 (106a, 106b, 106c, 106d); 108 (110a, 110b); 112 (114a, 114b, 114d, 114e, 114f); and 116 (118a, 118b). A total of images from seventy-four samples were subjected to image processing and segmentation to generate seven unique data sets (a matrix of seventy-four×seven) (here, using 120 (122a, 122b, 122c, 122d) and 124 (126)]. The NN was trained using NMR porosity of these samples (here, using 128).

At 128, a two-layered, feed-forward NN with twenty sigmoid hidden neurons and linear output neurons (FIT-NET) was used to fit the multi-dimensional problem. The network was trained with a Levenberg-Marquardt back-propagation algorithm (trainlm). The entire data set was divided into three parts: 1) training, 2) validation, and 3) testing. The Levenberg-Marquardt back-propagation algorithm keeps iterating for an optimal solution, but training stops as a mean square error of the validation stops improving. A regression plot of the output of neural response vs. target provides a reliable way to evaluate performance of the NN. Similarly, an error histogram of target-output provides a quick visual interpretation of neural performance. The data set of image properties is defined as matrix "data," whereas the target data set of NMR porosity was named "NMRPorosity0x25." Plots and code for training, validation and error histogram are presented and the MATLAB editor was utilized.

Figure 5B:
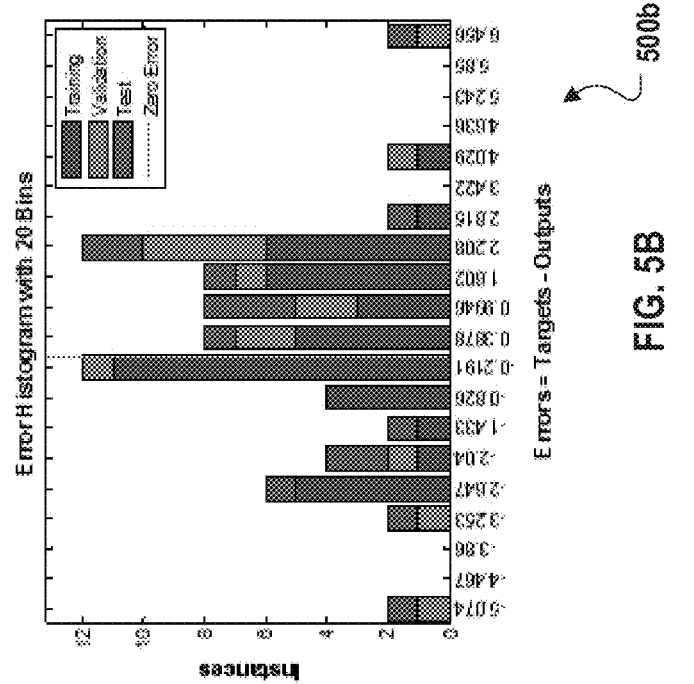
FIGS. 5A-5B are plots representing first iteration results of training and testing the selected NN but convergence fails, according to an implementation of the present disclosure.
Figure 5A:
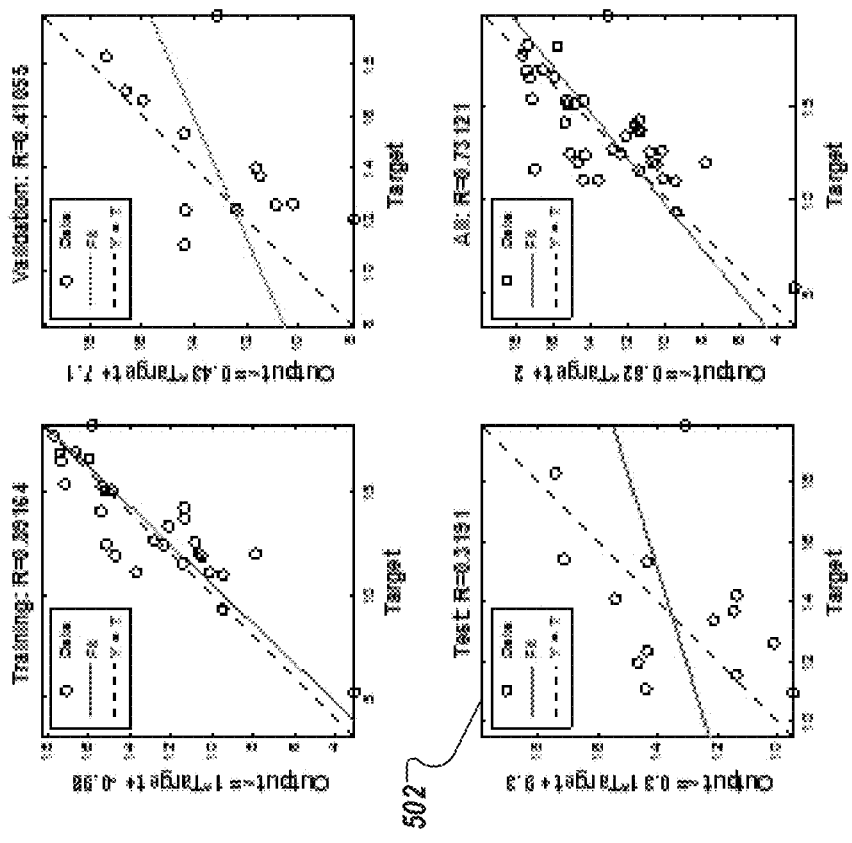

FIGS. 5A-5B are plots 500a and 500b representing first iteration results of training and testing the selected NN (at 128—but an iteration would also be generated, for example, at 108, 116, 124, 130, 136, and 162) but convergence fails ("Test R=0.3191"), according to an implementation of the present disclosure. Plot 500a is a regression plot of the output of neural response vs. target to evaluate performance of the NN. As can be seen in the plots 500a, subplot 502 indicates "Test, R=0.3191." Plot 500b is an error histogram of target-output providing a quick visual interpretation of neural performance.

Figure 6B:
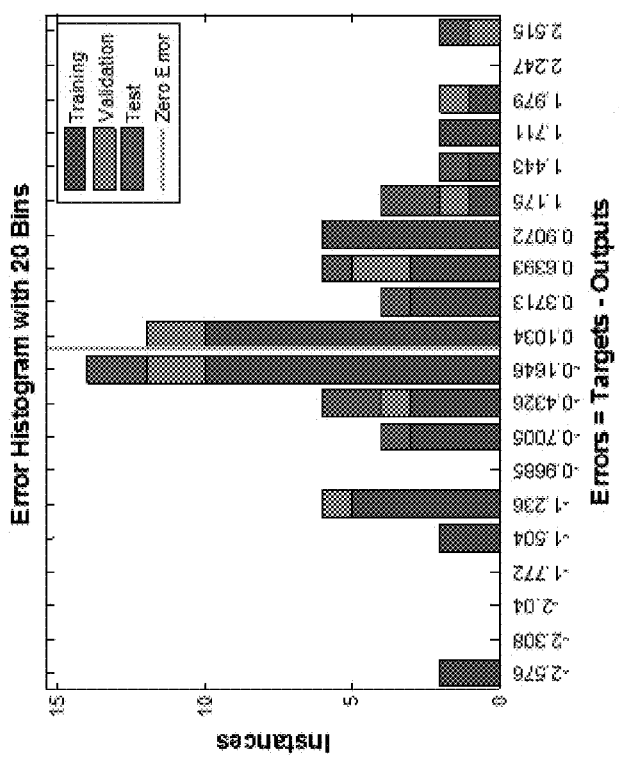
FIGS. 6A-6B are plots representing second iteration results of training and testing the selected NN where convergence is satisfactory, according to an implementation of the present disclosure.
Figure 6A:
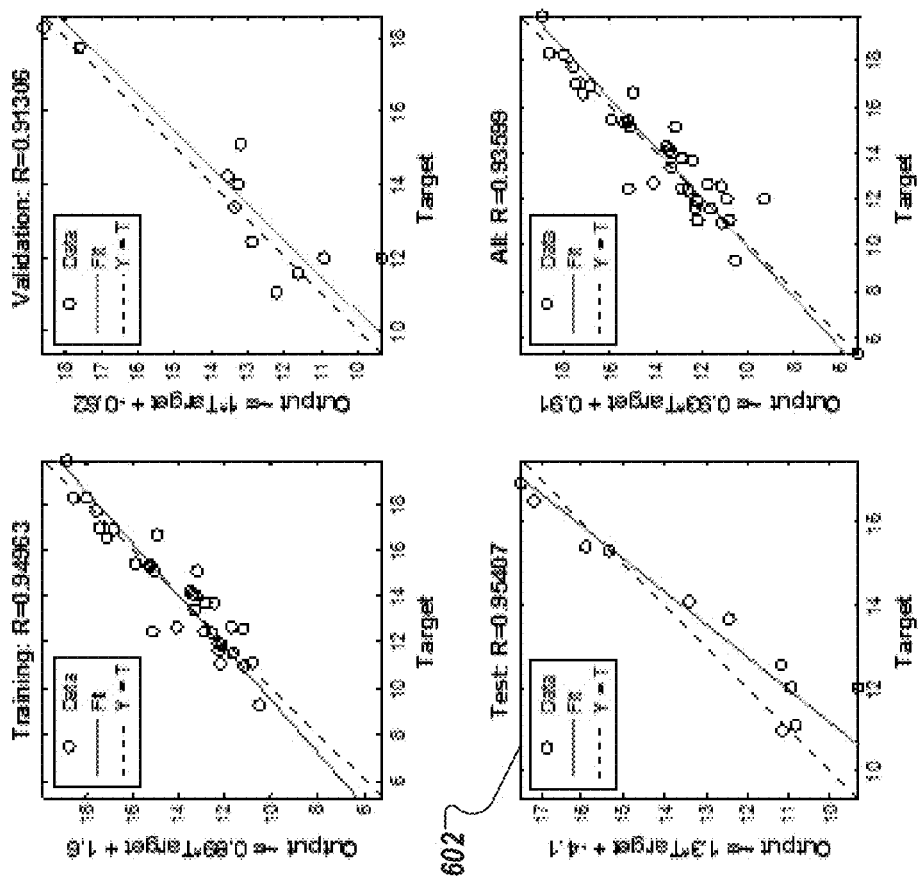

FIGS. 6A-6B are plots 600a and 600b representing second iteration results of training and testing the selected NN (at 128—but iteration would also be generated, for example, at 108, 116, 124, 130, 136, and 162) where convergence is satisfactory ("Test R=0.95407"), according to an implementation of the present disclosure. Plot 600a is a regression plot of the output of neural response vs. target to evaluate performance of the NN. As can be seen in the plot 600a, subplot 602 indicates that "Test, R=0.95407." Plot 600b is an error histogram of target-output providing a quick visual interpretation of neural performance. Following the second iteration, the NN is considered trained and usable for analyzing images of well cores for which there is no NMR porosity data available (only images) to predict porosities.

The second iteration provided a better improved fit, and such the resulting NN code (from 128) was saved and used for predicting porosities. An example of the resulting NN code is as follows:

```
% Solve an Input-Output Fitting problem with a
Neural Network
    % Script generated by NFTOOL
    % Created Sun Mar 06 14:06:19 AST 2016
    %
    % This script assumes these variables are defined:
    %
    % data - input data.
    % NMRPorosity0x25 - target data.
    inputs = data';
    targets = NMRPorosity0x25';
    % Create a Fitting Network
    hiddenLayerSize = 10;
    net = fitnet(hiddenLayerSize);
    % Choose Input and Output Pre/Post-Processing
Functions
    % For a list of all processing functions type: help
nnprocess
    net.inputs{1}.processFcns        =
{'removeconstantrows','mapminmax'};
    net.outputs{2}.processFcns       =
{'removeconstantrows','mapminmax'};
    % Setup Division of Data for Training, Validation,
Testing
    % For a list of all data division functions type: help
nndivide
    net.divideFcn = 'dividerand'; % Divide data randomly
    net.divideMode = 'sample'; % Divide up every sample
    net.divideParam.trainRatio = 60/100;
    net.divideParam.valRatio = 20/100;
    net.divideParam.testRatio = 20/100;
    % For help on training function 'trainlm' type: help
trainlm
    % For a list of all training functions type: help nntrain
    net.trainFcn = 'trainlm'; % Levenberg-Marquardt
    % Choose a Performance Function
    % For a list of all performance functions type: help
nnperformance
    net.performFcn = 'mse'; % Mean squared error
    % Choose Plot Functions
    % For a list of all plot functions type: help nnplot
    net.plotFcns                     =
{'plotperform','plottrainstate','ploterrhist', ...
            'plotregression', 'plotfit'};
    % Train the Network
    [net,tr] = train(net,inputs,targets);
    % Test the Network
    outputs = net(inputs);
    errors = gsubtract(targets,outputs);
    performance = perform(net,targets,outputs)
    % Recalculate Training, Validation and Test
Performance
    trainTargets = targets .* tr.trainMask{1};
    valTargets = targets . * tr.valMask{1};
    testTargets = targets . * tr.testMask{1};
    trainPerformance = perform (net,trainTargets,outputs)
    valPerformance = perform(net,valTargets,outputs)
    testPerformance = perform(net,testTargets,outputs)
    % View the Network
    view(net)
```

```
% Plots
% Uncomment these lines to enable various plots.
%figure, plotperform(tr)
%figure, plottrainstate(tr)
%figure, plotfit(net,inputs,targets)
%figure, plotregression(targets,outputs)
%figure, ploterrhist(errors)
```

In this case, a direct prediction of porosity was the end result. In other cases the output could be a range of values as a function of depth, or the output values could be more than one parameter. A multiple parameter output can then be used for further analysis to predict other petrophysical properties.

Post-Neural Network Empirical Relations

The output from a given NN for provided sets of input can then be either manipulated using empirical relations (for obtaining other petrophysical properties) or can be used as input to other NNs. The most common empirical relations are those, for this instance of porosity, in predicting permeability, fluid saturation, or other petrophysical properties. For example—porosity in relation to:

Connected and non-connected pores (empirical relation base on size of image and value of porosity),
Permeability (empirical relation to calculate permeability from porosity),
Saturation (relation between various shade analyses of an image),
Stresses (relation to calculate stress effect as function of porosity values vs. depth),
Mechanical strength (relation between porosity-depth-shades of color (for example, amplitude of red color in an image),
Seismic velocity (using seismic data as input to 128),
Fracturing capacity (as a function of boundaries between regions (red (brittle)-orange (soft))),
Unconventional micro-nano relation (this can be achieved at 112 from edge detection-thresholding and histogram binning),
Matrix vs. kerogen (this can be achieved at 112 by identifying various colors to represent various material elasticity), and
Various logging tool correction (logging tools need lab data to make corrections).

Figure 7:
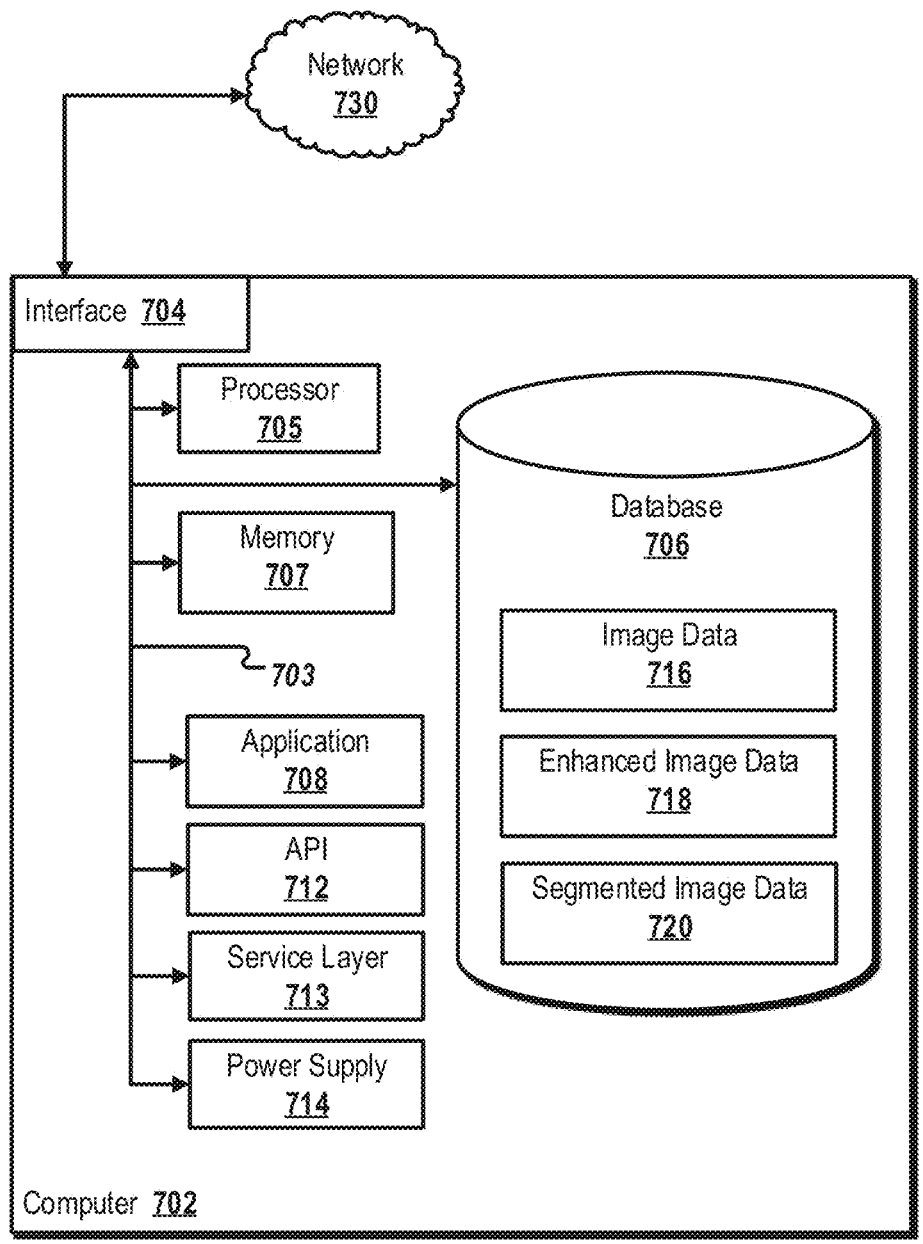
FIG. 7 is a block diagram of an exemplary computer system used to provide computational functionalities associated with described algorithms, methods, functions, processes, flows, and procedures as described in the instant disclosure, according to an implementation of the present disclosure.

FIG. 7 is a block diagram of an example computer system 700 used to provide computational functionalities associated with described algorithms, methods, functions, processes, flows, and procedures, as described in the instant disclosure, according to an implementation. The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the instant disclosure. The illustrated computer 702 is communicably coupled with a network 730. In some implementations, one or more components of the computer 702 can be configured to operate within an environment, including cloud-computing-based, local, global, another environment, or a combination of environments.

At a high level, the computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 730 (for example, from a client software application executing on another computer 702) and respond to the received requests by processing the received requests using a software application or a combination of software applications. In addition, requests can also be sent to the computer 702 from internal users (for example, from a command console or by another internal access method), external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether or not illustrated) that are communicably coupled to the computer 702. Moreover, any or all parts of the API 712 or the service layer 713 can be implemented as a child or a sub-module of another software module, enterprise application, or hardware module without departing from the scope of this disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is connected to the network 730 in a distributed environment. Generally, the interface 704 is operable to communicate with the network 730 and comprises logic encoded in software, hardware, or a combination of software and hardware. More specifically, the interface 704 can comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702, another component connected to the network 730 (whether illustrated or not), or a combination of the computer 702 and another component. For example, database 706 can be an in-memory, conventional, or another type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702. As illustrated, the database 706 holds previously described image data 716, enhanced image data 718, and segmented image data 720.

The computer 702 also includes a memory 707 that can hold data for the computer 702, another component or components connected to the network 730 (whether illustrated or not), or a combination of the computer 702 and another component. Memory 707 can store any data consistent with this disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 730. Further, the term "client," "user," or other appropriate terminology can be used interchangeably, as appropriate, without departing from the scope of this disclosure. Moreover, this disclosure contemplates that many users can use one computer 702, or that one user can use multiple computers 702.

Described implementations of the subject matter can include one or more features, alone or in combination.

For example, in a first implementation, a computer-implemented method, comprising: enhancing received image data to create enhanced image data using image processing to remove artifacts and to retrieve information associated with a desired target output; performing image segmentation on useable enhanced image data to created segmented image data by partitioning the enhanced image data into coherent regions with respect to a particular image-based criterion; pre-processing useable segmented image data and auxiliary data for input into a neural network as pre-processed data; dividing the pre-processed data into training, validation, and testing data subsets; determining a neural network architecture to process the pre-processed data; executing the determined neural network architecture using the pre-processed data; post-processing output of the determined neural network as post-processed data; and comparing the post-processed data to a known value range associated with the post-processed data to determine if the post-processed data satisfies a desired output result.

The foregoing and other described implementations can each, optionally, include one or more of the following features:

A first feature, combinable with any of the following features, wherein: image enhancement is based on one or more petrophysical properties and parameters associated with a reservoir, well site, or a condition of a well core, and a number and order of image enhancement techniques performed on the image data varies based on image format or image size; and a number and order of image segmentation techniques performed on the enhanced image data varies based on image format, image size, or a required result.

A second feature, combinable with any of the previous or following features, further comprising determining usability of the enhanced image data and the segmented image data.

A third feature, combinable with any of the previous or following features, wherein the received useable segmented image data is divided for placement into the training, validation, and testing subsets according to a percentage based on a number and type of a data set derived from the useable segmented image data.

A fourth feature, combinable with any of the previous or following features, further comprising determining whether the useable segmented image data in the training, validation, and testing data subsets is from a continuous or discrete data source.

A fifth feature, combinable with any of the previous or following features, wherein the neural network architecture is either supervised or unsupervised, wherein the supervised neural network architecture includes a recurrent or feed forward neural network type, and wherein the unsupervised neural network architecture includes an estimator or extractor neural network type.

A sixth feature, combinable with any of the previous or following features, further comprising performing additional processing on the post-processed data to derive other petrophysical properties or to generate a new data relationship.

In a second implementation, a non-transitory, computer-readable medium storing one or more instructions executable by a computer system to perform operations comprising: enhancing received image data to create enhanced image data using image processing to remove artifacts and to retrieve information associated with a desired target output; performing image segmentation on useable enhanced image data to created segmented image data by partitioning the enhanced image data into coherent regions with respect to a particular image-based criterion; pre-processing useable segmented image data and auxiliary data for input into a neural network as pre-processed data; dividing the pre-processed data into training, validation, and testing data subsets; determining a neural network architecture to process the pre-processed data; executing the determined neural network architecture using the pre-processed data; post-processing output of the determined neural network as post-processed data; and comparing the post-processed data to a known value range associated with the post-processed data to determine if the post-processed data satisfies a desired output result.

The foregoing and other described implementations can each, optionally, include one or more of the following features:

A first feature, combinable with any of the following features, wherein: image enhancement is based on one or more petrophysical properties and parameters associated with a reservoir, well site, or a condition of a well core, and a number and order of image enhancement techniques performed on the image data varies based on image format or image size; and a number and order of image segmentation techniques performed on the enhanced image data varies based on image format, image size, or a required result.

A second feature, combinable with any of the previous or following features, further comprising one or more instructions to determine usability of the enhanced image data and the segmented image data.

A third feature, combinable with any of the previous or following features, wherein the received useable segmented image data is divided for placement into the training, validation, and testing subsets according to a percentage based on a number and type of a data set derived from the useable segmented image data.

A fourth feature, combinable with any of the previous or following features, further comprising one or more instructions to determine whether the useable segmented image data in the training, validation, and testing data subsets is from a continuous or discrete data source.

A fifth feature, combinable with any of the previous or following features, wherein the neural network architecture is either supervised or unsupervised, wherein the supervised neural network architecture includes a recurrent or feed forward neural network type, and wherein the unsupervised neural network architecture includes an estimator or extractor neural network type.

A sixth feature, combinable with any of the previous or following features, further comprising one or more instructions to perform additional processing on the post-processed data to derive other petrophysical properties or to generate a new data relationship.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform operations comprising: enhancing received image data to create enhanced image data using image processing to remove artifacts and to retrieve information associated with a desired target output; performing image segmentation on useable enhanced image data to created segmented image data by partitioning the enhanced image data into coherent regions with respect to a particular image-based criterion; pre-processing useable segmented image data and auxiliary data for input into a neural network as pre-processed data; dividing the pre-processed data into training, validation, and testing data subsets; determining a neural network architecture to process the pre-processed data; executing the determined neural network architecture using the pre-processed data; post-processing output of the determined neural network as post-processed data; and comparing the post-processed data to a known value range associated with the post-processed data to determine if the post-processed data satisfies a desired output result.

The foregoing and other described implementations can each, optionally, include one or more of the following features:

A first feature, combinable with any of the following features, wherein: image enhancement is based on one or more petrophysical properties and parameters associated with a reservoir, well site, or a condition of a well core, and a number and order of image enhancement techniques performed on the image data varies based on image format or image size; and a number and order of image segmentation techniques performed on the enhanced image data varies based on image format, image size, or a required result.

A second feature, combinable with any of the previous or following features, further comprising one or more instructions to determine usability of the enhanced image data and the segmented image data.

A third feature, combinable with any of the previous or following features, wherein the received useable segmented image data is divided for placement into the training, validation, and testing subsets according to a percentage based on a number and type of a data set derived from the useable segmented image data.

A fourth feature, combinable with any of the previous or following features, further comprising one or more instructions to determine whether the useable segmented image data in the training, validation, and testing data subsets is from a continuous or discrete data source.

A fifth feature, combinable with any of the previous or following features, wherein the neural network architecture is either supervised or unsupervised, wherein the supervised neural network architecture includes a recurrent or feed forward neural network type, and wherein the unsupervised neural network architecture includes an estimator or extractor neural network type.

A sixth feature, combinable with any of the previous or following features, further comprising one or more instructions to perform additional processing on the post-processed data to derive other petrophysical properties or to generate a new data relationship.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or another unit for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a device that is used by the user (for example, by sending web pages to a web browser on a user's client device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving image data associated with a wellbore core;
enhancing the received image using image processing to remove artifacts and to retrieve information associated with a desired target output;
performing image segmentation on useable enhanced image data to create segmented image data by partitioning the enhanced image data into coherent regions with respect to a particular image-based criterion, wherein the image segmentation comprises color base image segmentation;
determining, based on usability criteria, that the segmented data is useable, wherein the usability criteria comprises a range of petrophysical values;
in response to determining that the segmented data is usable, pre-processing, using pre-processing techniques, the useable segmented image data and auxiliary data for input into a neural network as pre-processed data, wherein the pre-processing techniques comprise one or more of a set of arithmetic or geometric relations;
dividing the pre-processed data into training, validation, and testing data subsets;
determining a neural network architecture to process the pre-processed data;
executing the determined neural network architecture using the pre-processed data;
post-processing output of the determined neural network as post-processed data; and
comparing the post-processed data to a known value range associated with the post-processed data to determine if the post-processed data satisfies a desired output result.

2. The computer-implemented method of claim 1, wherein:
image enhancement is based on one or more petrophysical properties and parameters associated with a reservoir, well site, or a condition of a well core;
a number and order of image enhancement techniques performed on the image data varies based on image format or image size; and
a number and order of image segmentation techniques performed on the enhanced image data varies based on image format, image size, or a required result.

3. The computer-implemented method of claim 1, further comprising determining usability of the enhanced image data.

4. The computer-implemented method of claim 1, wherein the received useable segmented image data is divided for placement into the training, validation, and testing subsets according to a percentage based on a number and type of a data set derived from the useable segmented image data.

5. The computer-implemented method of claim 1, further comprising determining whether the useable segmented image data in the training, validation, and testing data subsets is from a continuous or discrete data source.

6. The computer-implemented method of claim 1, wherein the neural network architecture is either supervised or unsupervised, wherein the supervised neural network architecture includes a recurrent or feed forward neural network type, and wherein the unsupervised neural network architecture includes an estimator or extractor neural network type.

7. The computer-implemented method of claim 1, further comprising performing additional processing on the post-processed data to derive other petrophysical properties or to generate a new data relationship.

8. A non-transitory, computer-readable medium storing one or more instructions executable by a computer system to perform operations comprising:
receiving image data associated with a wellbore core;
enhancing the received image data using image processing to remove artifacts and to retrieve information associated with a desired target output;
performing image segmentation on useable enhanced image data to create segmented image data by partitioning the enhanced image data into coherent regions with respect to a particular image-based criterion, wherein the image segmentation comprises color base image segmentation;
determining, based on usability criteria, that the segmented data is useable, wherein the usability criteria comprises a range of petrophysical values;
in response to determining that the segmented data is usable, pre-processing, using pre-processing techniques, the useable segmented image data and auxiliary data for input into a neural network as pre-processed data, wherein the pre-processing techniques comprise one or more of a set of arithmetic or geometric relations;
dividing the pre-processed data into training, validation, and testing data subsets;
determining a neural network architecture to process the pre-processed data;
executing the determined neural network architecture using the pre-processed data;
post-processing output of the determined neural network as post-processed data; and
comparing the post-processed data to a known value range associated with the post-processed data to determine if the post-processed data satisfies a desired output result.

9. The non-transitory, computer-readable medium of claim 8, wherein:
image enhancement is based on one or more petrophysical properties and parameters associated with a reservoir, well site, or a condition of a well core;
a number and order of image enhancement techniques performed on the image data varies based on image format or image size; and
a number and order of image segmentation techniques performed on the enhanced image data varies based on image format, image size, or a required result.

10. The non-transitory, computer-readable medium of claim 8, further comprising one or more instructions to determine usability of the enhanced image data.

11. The non-transitory, computer-readable medium of claim 8, wherein the useable segmented image data is divided for placement into the training, validation, and testing subsets according to a percentage based on a number and type of a data set derived from the useable segmented image data.

12. The non-transitory, computer-readable medium of claim 8, further comprising one or more instructions to determine whether the useable segmented image data in the training, validation, and testing data subsets is from a continuous or discrete data source.

13. The non-transitory, computer-readable medium of claim 8, wherein the neural network architecture is either supervised or unsupervised, wherein the supervised neural network architecture includes a recurrent or feed forward neural network type, and wherein the unsupervised neural network architecture includes an estimator or extractor neural network type.

14. The non-transitory, computer-readable medium of claim 8, further comprising one or more instructions to perform additional processing on the post-processed data to derive other petrophysical properties or to generate a new data relationship.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
receiving image data associated with a wellbore core;
enhancing the received image data using image processing to remove artifacts and to retrieve information associated with a desired target output;
performing image segmentation on useable enhanced image data to create segmented image data by partitioning the enhanced image data into coherent regions with respect to a particular image-based criterion, wherein the image segmentation comprises color base image segmentation;
determining, based on usability criteria, that the segmented data is useable, wherein the usability criteria comprises a range of petrophysical values;
in response to determining that the segmented data is usable, pre-processing, using pre-processing techniques, the useable segmented image data and auxiliary data for input into a neural network as pre-processed data, wherein the pre-processing techniques comprise one or more of a set of arithmetic or geometric relations;
dividing the pre-processed data into training, validation, and testing data subsets;
determining a neural network architecture to process the pre-processed data;
executing the determined neural network architecture using the pre-processed data;
post-processing output of the determined neural network as post-processed data; and
comparing the post-processed data to a known value range associated with the post-processed data to determine if the post-processed data satisfies a desired output result.

16. The computer-implemented system of claim 15, wherein:
image enhancement is based on one or more petrophysical properties and parameters associated with a reservoir, well site, or a condition of a well core;
a number and order of image enhancement techniques performed on the image data varies based on image format or image size; and
a number and order of image segmentation techniques performed on the enhanced image data varies based on image format, image size, or a required result.

17. The computer-implemented system of claim 15, further comprising one or more instructions to determine usability of the enhanced image data.

18. The computer-implemented system of claim 15, wherein the useable segmented image data is divided for placement into the training, validation, and testing subsets according to a percentage based on a number and type of a data set derived from the useable segmented image data.

19. The computer-implemented system of claim 15, further comprising one or more instructions to determine whether the useable segmented image data in the training, validation, and testing data subsets is from a continuous or discrete data source.

20. The computer-implemented system of claim 15, wherein the neural network architecture is either supervised or unsupervised, wherein the supervised neural network architecture includes a recurrent or feed forward neural network type, and wherein the unsupervised neural network architecture includes an estimator or extractor neural network type.

21. The computer-implemented system of claim 15, further comprising one or more instructions to perform additional processing on the post-processed data to derive other petrophysical properties or to generate a new data relationship.

* * * * *

UNITED STATES PATENT AND TRADEMARK OFFICE
CERTIFICATE OF CORRECTION

PATENT NO.        : 10,991,078 B2
APPLICATION NO.   : 16/131341
DATED             : April 27, 2021
INVENTOR(S)       : Mustafa Hakimuddin Page 1 of 1

It is certified that error appears in the above-identified patent and that said Letters Patent is hereby corrected as shown below:

In the Claims

Column 37, Line 56, Claim 4, before "useable" delete "received".

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*